United States Patent
Fossati et al.

(10) Patent No.: US 11,263,994 B2
(45) Date of Patent: Mar. 1, 2022

(54) DISPLAYS HAVING CALIBRATORS

(71) Applicant: HEWLETT-PACKARD DEVELOPMENT COMPANY, L.P., Spring, TX (US)

(72) Inventors: Humberto M. Fossati, Spring, TX (US); Greg Staten, Spring, TX (US); John W. Frederick, Spring, TX (US); Syed S. Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/342,422

(22) PCT Filed: Oct. 20, 2016

(86) PCT No.: PCT/US2016/057940
§ 371 (c)(1),
(2) Date: Apr. 16, 2019

(87) PCT Pub. No.: WO2018/075048
PCT Pub. Date: Apr. 26, 2018

(65) Prior Publication Data
US 2019/0251929 A1    Aug. 15, 2019

(51) Int. Cl.
*G09G 5/00* (2006.01)
*G09G 5/02* (2006.01)
(Continued)

(52) U.S. Cl.
CPC .............. *G09G 5/02* (2013.01); *G01J 3/463* (2013.01); *G09G 3/00* (2013.01); *G09G 3/2003* (2013.01);
(Continued)

(58) Field of Classification Search
None
See application file for complete search history.

(56) References Cited

U.S. PATENT DOCUMENTS 5,805,146 A  *  9/1998  Jaeger ................ G02F 1/13306
                                                        345/172
6,459,425 B1    10/2002  Holub et al.
(Continued)

FOREIGN PATENT DOCUMENTS

CN          102137272        7/2011
EP          2722836 A1       4/2014
(Continued)

OTHER PUBLICATIONS

Calibrating Displays with Built-in Ambient Light Sensing, May 6, 2016, < https://support.apple.com/en-in/HT202089 >.

*Primary Examiner* — Carl Adams
(74) *Attorney, Agent, or Firm* — Hanley Flight & Zimmerman LLC

(57) ABSTRACT

Displays having calibrators are disclosed. An example display includes a sensor to measure a plurality of readings for color settings of a color pattern presented by the display. A processor is to calculate average values corresponding to respective ones of the plurality of readings for the color settings. A calibration manager is to generate calibrated measurement values based on the average values. The calibrated measurement values to enable determination of color space information for the display.

18 Claims, 9 Drawing Sheets

(51) Int. Cl.
*G09G 3/20* (2006.01)
*G09G 3/00* (2006.01)
*G01J 3/46* (2006.01)
*H04N 9/64* (2006.01)

(52) U.S. Cl.
CPC ..... *H04N 9/643* (2013.01); *G09G 2320/0242* (2013.01); *G09G 2320/0666* (2013.01); *G09G 2320/0693* (2013.01)

(56) References Cited

U.S. PATENT DOCUMENTS

| | | | |
|---|---|---|---|
| 7,505,025 | B2 | 3/2009 | Edelbrock |
| 8,648,794 | B2 | 2/2014 | Nishida |
| 8,692,854 | B2 | 4/2014 | Huang |
| 2002/0113867 | A1* | 8/2002 | Takigawa ............. H04N 13/398 348/51 |
| 2006/0280360 | A1* | 12/2006 | Holub ................ H04N 17/045 382/162 |
| 2007/0115228 | A1 | 5/2007 | Roberts et al. |
| 2007/0115397 | A1 | 5/2007 | Bolas et al. |
| 2007/0242064 | A1 | 10/2007 | Kuo |
| 2008/0204437 | A1* | 8/2008 | Jensen ..................... G01J 1/04 345/207 |
| 2010/0053212 | A1* | 3/2010 | Kang ............... H04N 21/41407 345/629 |
| 2011/0157244 | A1 | 6/2011 | Nakano et al. |
| 2012/0044224 | A1* | 2/2012 | Michisaka ........... G09G 3/3648 345/207 |
| 2015/0228213 | A1 | 8/2015 | Cho |

FOREIGN PATENT DOCUMENTS

| | | |
|---|---|---|
| JP | 09298674 | 11/1997 |
| JP | 2004146936 | 5/2004 |
| JP | 2010250060 | 11/2010 |
| JP | 2011022226 A | 2/2011 |
| JP | 2012150136 | 8/2012 |
| JP | 2014132304 | 7/2014 |

* cited by examiner

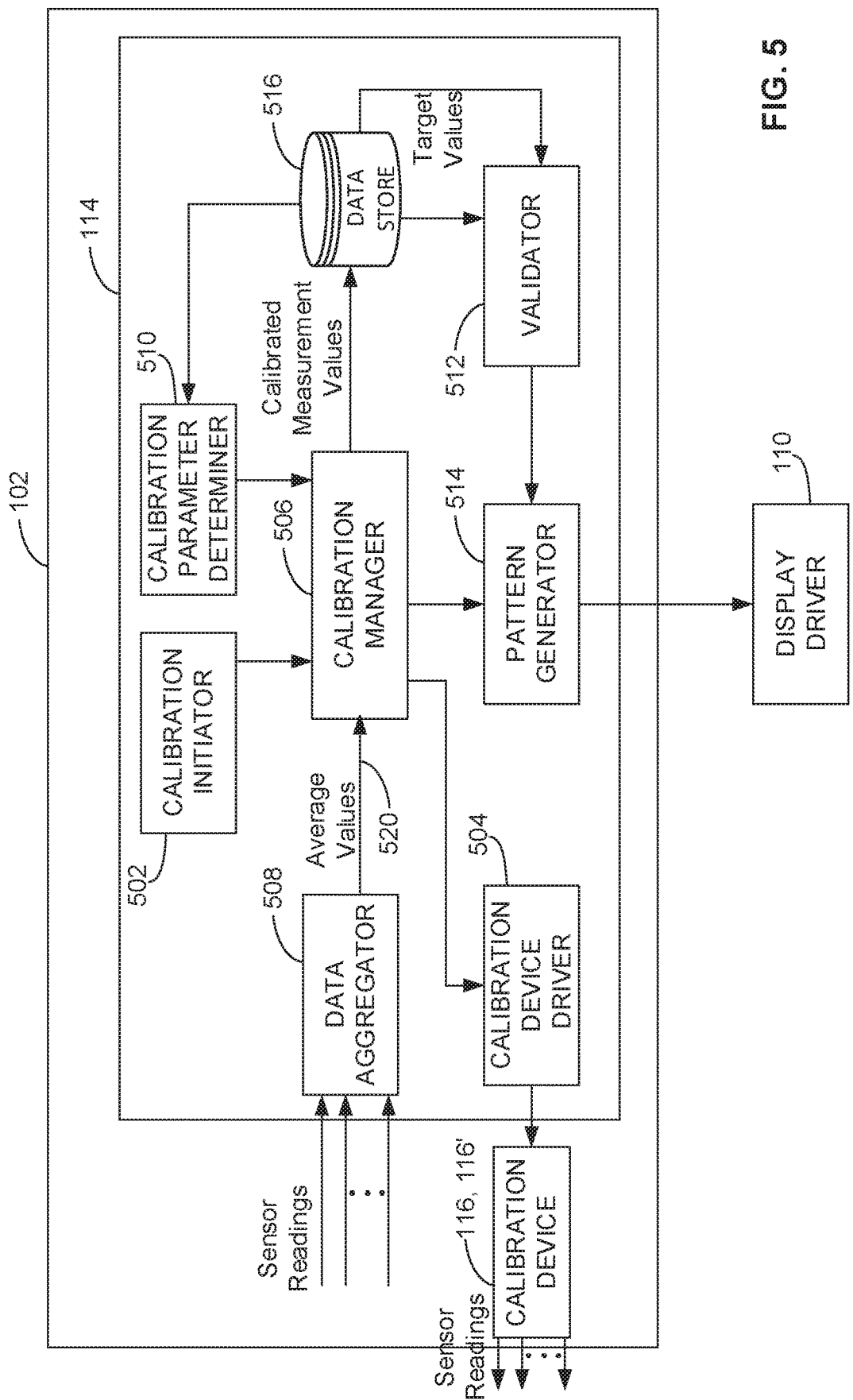

DISPLAYS HAVING CALIBRATORS

BACKGROUND

Imaging devices such as, for example, LCD (liquid crystal displays) are widely used in professional photography, video and/or graphics environments and/or other environments. Imaging devices alter primary colors, brightness and saturation to conform to a standardized color space or output device specification.

BRIEF DESCRIPTION OF THE DRAWINGS

FIG. 5 is a block diagram representative of an example implementation of the example calibration system of FIG. 1.

Figure 1:
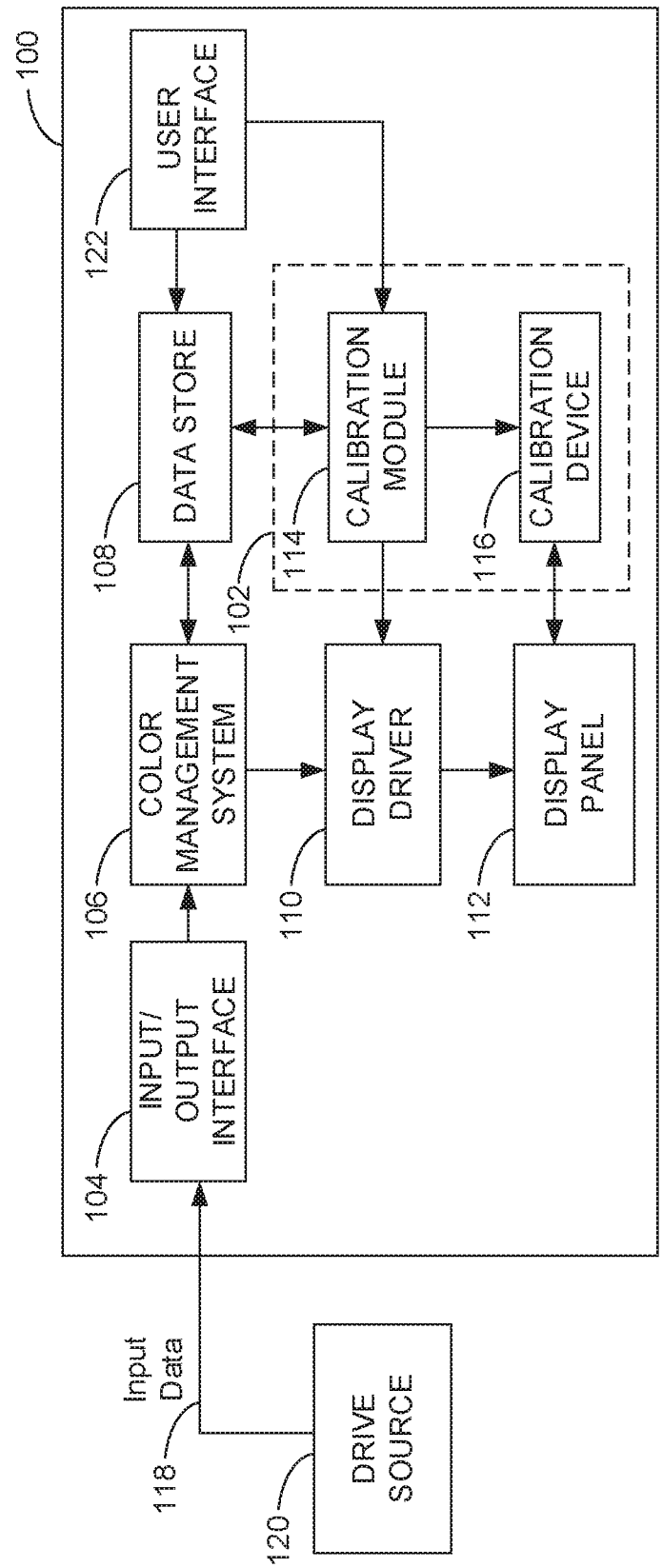
FIG. 1 is a block diagram of an example display having a calibration system constructed in accordance with the teachings of this disclosure.

Certain examples are shown in the above-identified figures and described in detail below. The figures are not to scale and certain features and certain views of the figures may be shown exaggerated in scale or in schematic for clarity and/or conciseness. Additionally, some components of the example displays or calibration devices disclosed herein may have been removed from some of the drawing(s) for clarity. Although the following discloses example methods and apparatus, it should be noted that such methods and apparatus are merely illustrative and should not be considered as limiting the scope of this disclosure.

As used herein, directional terms, such as "upper," "lower," "top," "bottom," "front," "back," "leading," "trailing," "left," "right," etc. are used with reference to the orientation of the figures being described. Because components of various examples disclosed herein can be positioned in several different orientations, the directional terminology is used for illustrative purposes and is not intended to be limiting. As used herein, substantially and approximately mean less than 10% different than the term at issue relative to a reference. For example, approximately 10 degrees means 10 degrees plus or minus 10% between 9 degrees and 11 degrees. For example, substantially perpendicular relative to a reference means 90 degrees relative to a reference plus or minus 10% (e.g., between 81 degrees and 109 degrees).

The drawings are provided as example(s) or implementation(s), but not limiting of the scope of the disclosure.

DETAILED DESCRIPTION

Imaging devices such as, for example, LCD (liquid crystal displays), plasma displays, OLED (organic light emitting diode) displays and projection systems employ color management to control conversion of color representations between various devices. Color management helps to achieve the same appearance of the same media on all devices, provided the devices can deliver the needed color intensities. To provide color management, imaging devices are calibrated to determine imaging deviations (e.g., calibrated measured values) of the specific imaging device. In operation, the calibrated imaging device alters input data representative of an image based on the calibrated measured values so that the imaging device accurately displays the image corresponding to the received input data.

Imaging displays such as, for example, LCD (liquid crystal displays), plasma displays, OLED (organic light emitting diode) displays and projection systems generate images having a color space that is adapted to the sensitivity of the human eye. Due to manufacturing variances, environmental conditions, etc., different imaging devices may exhibit different color space characteristics. However, it is desirable for the colors actually output by the display to closely match the colors intended for the displayed media. Displays employ color correction to modify displayed color space information to match color space information provided by image data received from a drive source (e.g., a CPU). Due to display performance characteristics (e.g., response performance, chromaticity levels, etc.), displays are calibrated to provide consistent color space matching between image data received and the image output by the display. Calibration of the display ensures that the color space or scheme of an image presented by the display matches a color space or scheme of the image data (e.g., media) received by the display. In some instances, displays are calibrated during manufacturing (e.g., after assembly). However, factory calibration settings do not suffice for certain application(s) and/or deviate from original settings as the display ages (e.g., after 500 hours of use).

To automate calibration without requiring the presence of a person (e.g., a trained person), some example displays employ a single built-in calibration sensor. However, some built-in calibration sensor systems tune or adjust preloaded calibration measured values (e.g., look-up tables) based on a measured luminance value detected by the built-in sensor. In other words, such tuning techniques do not redevelop calibration measured values, but simply modify luminance (e.g., brightness levels) based on existing calibration values that were previously determined (e.g., factory calibration values). Such modification based on fixed, pre-existing calibrated measured values may provide inaccurate color output characteristics, thereby reducing performance characteristics of the display. Further, in some instances, measuring white point (e.g., luminance and balance) may result in inaccurate measurements due to inherent noise associated with a sensor device. For example, when measuring a color setting on a darker scale (e.g., grayscale), ambient light from the environment may affect an accuracy of a measured reading obtained by the sensor, which can lead to inconsistencies between the image data color space information and the output performance of the display.

Example systems and methods may provide calibration techniques that manipulate the color space or color gamut of a display. Rather than using static calibration values (e.g., factory calibration values) across the lifetime of the display, the example systems and methods may employ calibration systems which adjust the color calibration settings of the display each time a calibration is performed. In other words, example calibration systems may enable creation of calibration measurement values (e.g., look-up tables) for color calibration as part of the calibration process instead of following the prior inferior method of employing a pre-set look-up table that may not represent the capabilities of the display. Thus, in examples, previously generated calibration measurement values are redeveloped based on the currently existing performance characteristics of the display. For example, performance characteristic loss of the display is adjusted or accounted for during calibration. Such calibrated measurement values (e.g., a calibrated measurement set) improve the performance of the display by taking into account degradation due to aging or use.

To perform calibration, example displays may employ a calibration system. In some such examples, the calibration system is integral (e.g., built-in) with the display it services. In some examples, the calibration system is a standalone calibration system that can automatically calibrate the display without human participation. Some example calibration modules disclosed herein employ calibration sensor(s) that measure a plurality of readings (e.g., at least five readings, between approximately 2 readings and 15 readings, etc.) for a color setting (e.g., a primary color, a white point, a brightness level, etc.) presented by a plurality of color patterns. In some such examples, the calibration system calculates an average value of the measured readings for a color setting and/or luminance setting. The average value of the readings for the corresponding color setting and/or luminance setting are employed as a plurality of input values that are used during a calibration process. The average values may be representative of color tones (e.g., primary colors, secondary colors), white points and/or brightness (e.g., luminance and/or greyscale) that are used as values during a calibration process. In some examples, a calibration sensor takes a plurality of readings (e.g., n number of readings) of a color setting at one location on the display over a specified period (e.g., over 50 milliseconds, 100 milliseconds, etc.). The number of readings can be user defined. In some examples, the calibration system employs a plurality of calibration sensors to obtain multiple readings of a color setting at two or more different locations (e.g., two adjacent points) on the display over a specified period (e.g., 100 milliseconds). The multiple readings obtained by the calibration sensors may be taken simultaneously at two or more different locations.

To increase calibration accuracy, the calibration module of some examples determines calibrated measurement values based on average values for corresponding color settings measured by the calibration sensor(s). In some instances, using average values of measurements provided by the calibration sensors enable compensation for noise (e.g., greyscale noise) or other inaccuracies or inconsistencies that may be inherent in calibration sensors (e.g., colorimeters). For example, colorimeters may provide inconsistent or inaccurate readings when measuring white balance or white points, greyscale and/or luminance values. Thus, by calibrating the display using an average value of multiple measurements, example methods and apparatus disclosed herein increase calibration accuracy by averaging out noise inherent in the calibration sensors. This improved accuracy enables some examples to employ lower cost sensors. In some examples, a plurality of brightness levels across different portions of the display may be measured simultaneously to determine any inconsistencies in the brightness provided by a backlight of the display across different portions (e.g., zones) of the display viewing area.

Some example calibration systems disclosed herein include a calibration device that may include a calibration sensor (e.g., colorimeter, an XYZ sensor with color filters, etc.). Unlike some calibration devices, example calibration sensors disclosed herein implement xyz color sensors with filters on three photodiodes to allow for the measurement of light energy of specific light wavelengths. In some examples, calibration systems disclosed herein may include a calibration device that may include a plurality of calibration sensors (e.g., two sensors, three sensors, etc.) supported by a carrier. In some examples, calibration systems disclosed herein may include a plurality of calibration devices (e.g., two calibration devices, three calibration devices, etc.) supported by a carrier. In some such examples, corresponding ones of the calibration devices disclosed herein may include a sensor or a plurality of sensors (e.g., two sensors, three sensors, etc.) supported on a carrier. In some examples, calibration devices disclosed herein may be positionable in different zones or viewing areas (e.g., a calibration device in a first quadrant, a calibration device in a second quadrant, a calibration device in a third quadrant and/or a calibration device in a fourth quadrant) of the display. In some such examples, a calibration sensor may be positionable in multiple different zones of the display.

Turning more specifically to the illustrated examples, FIG. 1 is a block diagram of an image presentation device or display 100 including an example calibration system 102 constructed in accordance with the teachings of this disclosure. More specifically, the calibration system 102 of the illustrated example is integrally formed (e.g., built-in) with the display 100 and the calibration system 102 is a standalone system. For example, the calibration system 102 is a calibrator that can perform calibration of the display 100 automatically without input from a user or an external data source (e.g., a computer).

The display 100 of the illustrated example includes an example input/output interface 104, an example color management system 106, an example data store 108, an example display driver 110, an example display panel 112, the example calibration system 102, and an example user interface 122. The example calibration system 102 of this example includes an example calibration module 114 and an example calibration device 116.

The display 100 of the illustrated example receives input data 118 from a drive source 120 via the input/output interface 104. The drive source 120 may be, for example, a computer, a television receiver, a camera, a video camera, medical equipment, a graphics card, a cell phone, or any other source of media. The input/output interface 104 of the display 100 may be implemented as a Universal Serial Bus (USB) interface, an Ethernet interface, a Data Display Channel/Command Interface (DDC/CI), a digital video input (DVI), a wireless interface (e.g., Bluetooth, WIFI, etc.) and/or any other communication interface.

In operation, the display 100 of the illustrated example receives encoded color space information via the input data 118. The input data 118 may be an image source, a video source and/or other input data formatted or encoded with color space information (e.g., a standard color space). For example, a source may provide static image(s), moving image(s), a partial image(s) or whole frame of video formatted with a specific or standard color space, etc. A color space as used defines a set of colors using a set of at least three parameters (e.g., tristimulus values) to create a desired perceived tone response. A tone response describes a mapping of luminance between the input data 118 provided by the drive source 120 and an output response provided by the display 100. For example, encoded color space information has been developed based on the CIE u, v or CIE u'v' color space chromaticity chart defined by the International Commission on Illumination, which is representative of color gamut visible by the human eye. For example, CIEXYZ color space encodes a set of colors using a set of at least three parameters (e.g., tristimulus values x, y and z) representative of three primary colors red, green and blue when presented at a specified luminance or brightness. Encoded color space or color gamut presets may include, but are not limited to, sRGB D65, sRGB D50, AdobeRGB, BT.709, BT.2020, DCI P3.

Due to various color space encodings, the actual RGB chromaticity (e.g., an objective specification of a quality of a color regardless of its luminance) of the input data 118 provided by the drive source 120 may be different than the native RGB chromaticity output response of the display 100. For example, the display panel 112 of the illustrated example has a set of primary colors which encompasses any desired color space gamut (e.g., a color pallet) the display 100 is to replicate. For example, the display 100 of the illustrated example may include a gamut (e.g., a set of colors or pallet that the display panel 112 can produce) that are more saturated (super-saturated) than some displays. However, without proper color manipulation, a display with a large gamut (e.g., a gamut that includes more colors than the standard encoded color gamut presets) may present an improper a color output response. For example, the primaries of the display may have different tone responses from the other primaries, which can lead to an unpredictable or inaccurate overall color response.

To provide color accuracy or an accurate color rendition (e.g., a substantial match between a measured color or perceived color from the display and an expected color or value), the display 100 of the illustrated example includes the color management system 106. The color management system 106 of the illustrated example configures the input data 118 from the drive source 120 and commands the display driver 110 to output an image associated with the input data 118 with a color setting that substantially matches a color setting provided by the input data 118. For example, the color management system 106 of the illustrated example configures the performance of the display 100 to substantially match the desired output characteristics associated with the input data 118. Output performance characteristics of the display 100 of the illustrated example are associated with color space properties that include, for example, primary colors (e.g., red, green, blue), secondary colors (cyan, magenta, yellow), tone response (e.g., gamma curve), white point (e.g., chromaticity of a color reproduced by equal or near equal primary components), and luminance (e.g., brightness level of a light source of the display panel 112). White point, for example, is a measure of chromaticity of a color reproduced by equal or near equal primary components (e.g., red=green=blue). Luminance, for example, denotes radiant power of a light source weighted by a spectral sensitivity function that is a characteristic of human vision. Luminance is a characteristic of brightness of a light source to compensate how a human eye perceives the color presented rather than just a measure of light intensity. Such color space information or properties may be stored in the data store 108 and retrieved by the color management system 106 when correlating input data 118 to the output response of the display 100.

Thus, for a given input value for a particular pixel of the display panel 112, the display 100 of the illustrated example conforms to an output color space specification that is expected to emit substantially the same luminance at substantially the same perceived color of the image data 118. To associate or correlate color space information provided by the input data 118 to a substantially similar color space based on the performance characteristics (e.g., response time, native color settings, etc.) of the display 100, the color management system 106 of the illustrated example employs a calibrated profile (e.g., calibrated measurement values presented via look-up tables). For example, as described in detail below, rather than repeatedly using a table preset during manufacturing, the calibration system 102 of the illustrated example generates a calibrated profile during a calibration cycle and stores the information in the data store 108. The color management system 106 of the illustrated example employs the calibrated profile or calibrated measurement values (e.g., a calibrated measurement set) to provide consistency between a source of content providing the input data 118 and an output of the display 100 that is used to present that content. For example, the color management system 106 of the illustrated example employs the calibrated profile to substantially match, color, brightness, gamma, and/or white balance settings of the display panel 112 that will display an image associated with the input data 118 having a set of standards for color (e.g., red, green, blue), brightness, gamma, and white balance.

For example, the calibration system 102 of the illustrated example characterizes the display 100 to determine the color chromaticity and tone response for the primary values. To enable such characterization of the display 100, the calibration system 102 of the illustrated example creates a calibrated measurement set (e.g., coefficients, a matrix, look-up tables, etc.) that shift a white point of the input data 118 representing primaries of the desired color space to a white point of the characterized actual primaries of the display 100. The white point is a chromaticity of a color reproduced by equal or near equal primary components. A tone response refers to a mapping of luminance between the input data and the output response provided by the display. Gamma is a form of tone response, which is the ratio of a derivative of a log of a video output to a derivative of a log of a video input usually expressed as a power (exponential) function. Because an intensity of light generated by a physical device is not a linear function of an input signal provided by the input data 118, gamma provides a method of expressing this ratio. Thus, due to various color space encodings (e.g., standard color space encodings or user defined color space encodings), the actual chromaticity of the drive source 120 may be different than a native chromaticity of the display panel 112. Thus, the color management system 106 employs the calibration profile to characterize or correlate the color space encodings of the input data 118 (e.g., encoded primaries, first white point, tone response, etc.) to the color space capabilities of the display 100 (e.g., a set of native primaries having respective characterized tone responses with respect to the color capability of the display 100).

An example method to generate calibration coefficients is disclosed in U.S. Pat. No. 8,654,142.

The calibration system 102 of the illustrated example generates the calibrated measurement values of the display 100. A calibration cycle may be initiated via the user interface 122, generally, in response to an event (e.g., periodically) and/or may be initiated based on parameter that may be set by a user via the user interface 122. For example, the user interface 122 may include buttons, remote controls, and/or other inputs to enable navigation through a menu (e.g., On-Screen Display) to initiate a calibration cycle and/or to manually adjust color space information of the display 100 (e.g., preset or standard color space gamut, brightness, gamma value, etc.). In some examples, the calibration system 102 of the illustrated example automatically initiates a calibration cycle based on an event (e.g., expiration of a timer), a calibration initiation setting or a calibration trigger (e.g., a user-defined calibration setting) that may be set via the user interface 122. A calibration trigger may include, for example, a target number of hours (e.g., every 500 hours) between calibrations, specific day or time schedule, etc. In some examples, a calibration cycle may be initiated via a remote management system communicatively coupled to the display 100 via, for example, wireless communication, a public and/or private network, etc. In some examples, calibration parameters may be provided (e.g., uploaded) to the display 100 via an input/output interface (e.g., a Universal Serial Bus drive, a disc drive, etc.) and/or may be provided to the display via a remote management system. Thus, the example calibration system 102 disclosed herein enables manual initiation of a calibration cycle. Additionally, or alternatively, the example calibration system 102 provides automatic initiation of a calibration cycle without a presence or assistance from a user/human.

When calibration is initiated, the calibration module 114 causes or drives the calibration device 116 to move between a non-calibration position (e.g., a first position within a housing or bezel of the display 100) and a calibrated position (e.g., a second position which the calibration device 116 extends from the housing and is located adjacent a viewing area of the display panel 112). The calibration device 116 of the illustrated example is integrally formed with the display 100. Thus, calibration of the display 100 is performed without use of any external sensors or devices. In the non-calibration position, the calibration device 116 of the illustrated example is positioned or nested (e.g., stored) in a housing of the display 100 (e.g., behind a bezel of the display 100). In the calibration position, the calibration device 116 of the illustrated example at least partially protrudes from within the housing of the display 100. In the calibration position, the calibration device 116 of the illustrated example positions a calibration sensor or a plurality of calibration sensors adjacent the display panel 112 of the display 100. In some examples, the calibration device 116 includes a sensor supported on a carrier. In some examples, the calibration device 116 includes a plurality of sensors supported on a carrier. In some examples, the calibration device 116 may include a plurality of calibration devices 116 positionable to different locations on the display 100. In some examples, corresponding ones of the calibration devices 116 may include a sensor or a plurality of sensors supported by a carrier. The calibration device 116 of the illustrated example automatically moves (e.g., via a motor) between the non-calibration position and the calibration position. In some examples, the calibration device 116 may be manually moved (e.g., by a user/human) between the calibration position and the non-calibration position.

When the calibration device 116 of the illustrated example is in the calibrated position, the calibration module 114 commands the display driver 110 to generate color patterns on the display panel 112 adjacent the calibration sensor(s) associated with the calibration device 116. In turn, the example calibration device 116 measures a plurality of readings of a color setting presented by the color patterns. For example, the color setting may include primary colors, secondary colors, white point, luminance, etc. The measured readings (e.g., at least five readings) obtained by the calibration device 116 for corresponding ones of the color setting(s) and/or luminance are averaged and used by the calibration module 114 to calibrate the display 100. As described in greater detail below in connection with FIG. 5, the calibration module 114 of this example generates conversion coefficient tables (e.g., a pre-LUT, a matrix, and/or a post-LUT) using the average values measured by the calibration device 116 when a calibration is performed. The conversion coefficients are stored in the data store 108 of the illustrated example and retrieved by the color management system 106 to correlate the color settings of the display 100 based on the color setting information provided by the input data 118. Thus, as noted above, the calibration system 102 of the illustrated example generates conversion coefficient tables whenever a calibration is performed. In this manner, the conversion coefficient table more closely matches performance characteristics of the display 100 over time than a factory preset table can, thereby increasing the performance of the display 100 throughout its lifetime.

In some examples, the display 100 may be configured as a 10-bit LCD panel and a light emitting diode (LED) backlight incorporating red, green and blue LEDs, and have a native color gamut that is wider or offers a more dynamic range than many standardized output device specifications employed in color critical settings. In some such examples, the LCD panel includes at least three addressable subpixels corresponding to a single pixel of the display 100. The subpixels may be assigned a respective 10-bit value. The subpixels correspond to an individual color (e.g., red, green, or blue) subpixel. Accordingly, because a 10-bit LCD panel can be employed, a single subpixel can produce $2^{10}$ levels of intensity. Because a single pixel corresponds to the three (red, green, and blue) subpixels, $(2^{10})^3$ discrete colors can be reproduced from a single pixel of the display. Example displays disclosed herein can employ LCD panels supporting various bit depths. In addition, in some such examples, an LED backlight permits white point control via the backlight without adjusting red, green, and/or blue maximum levels of the subpixels of the display panel 112. In other words, because the red, green, and blue channels of the backlight can be independently controlled, a white point can be chosen and/or varied to various standard output device specifications without compensating the maximum subpixel values assignable for red, green, and blue subpixels. In some examples, an RGB LED backlight can be configured as an array of LED clusters that can independently emit red, green, and blue light and/or combinations thereof. In some such examples, a backlight (e.g., a white light) maybe adjusted (e.g., intensity of the light may be increased or decreased) to improve visibility of the pixels of the LCD panel, particularly in low light conditions. In addition, because the RGB LED backlight includes a plurality of LED clusters having the capability to emit red, green, and blue light, the levels of red, green, and blue light emitted by corresponding ones of the LED clusters can be varied to produce various luminance and/or white point settings to the desires of a user or to comply with a standard output device specification. Various standard output device specifications can define a different color gamut, each having a different definition of a white point. Accordingly, as noted above, the RGB LED backlight permits an adjustable white point depending on a standard output device specification chosen, which can be employed without adjusting the maximum subpixel values assignable for red, green, and blue subpixels of the LCD panel to compensate for a non-white output of an alternative backlight. In some examples, the display 100 of the illustrated example may be an OLED display, an LED display, a plasma display and/or any other display types. In some examples, the display 100 may be a display for a notebook or laptop computer, a monitor, a television, and/or another imaging device(s).

Figure 2A:
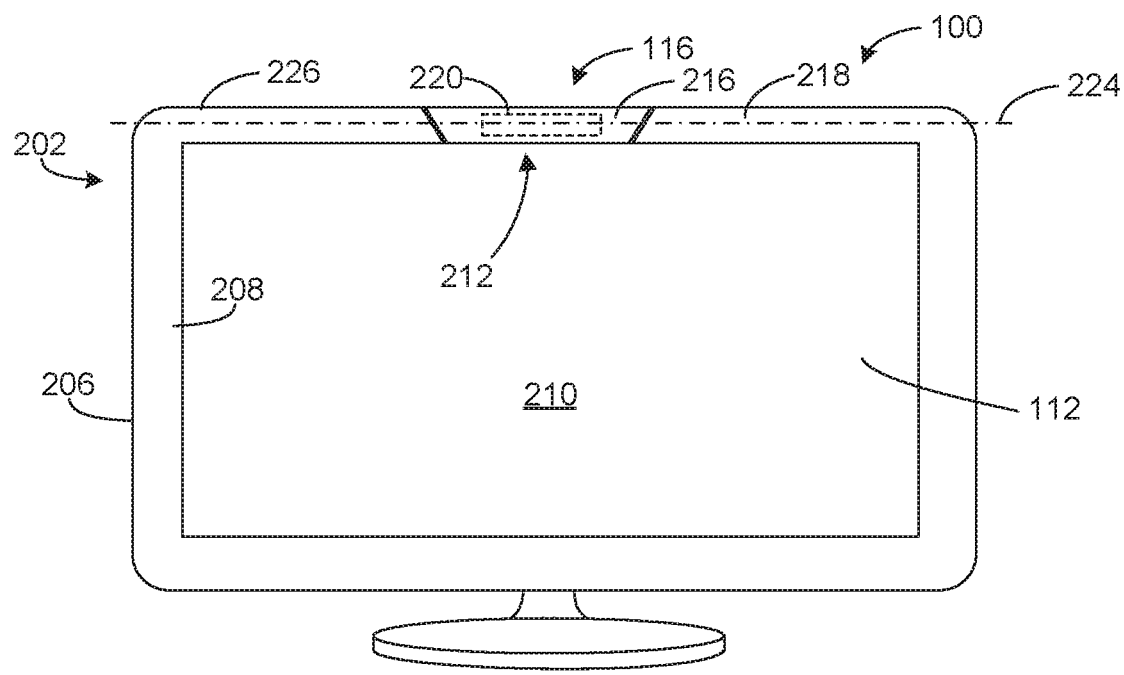
FIG. 2A illustrates an example implementation of the example display of FIG. 1 with an example calibration device shown in a non-calibration condition.
Figure 2B:
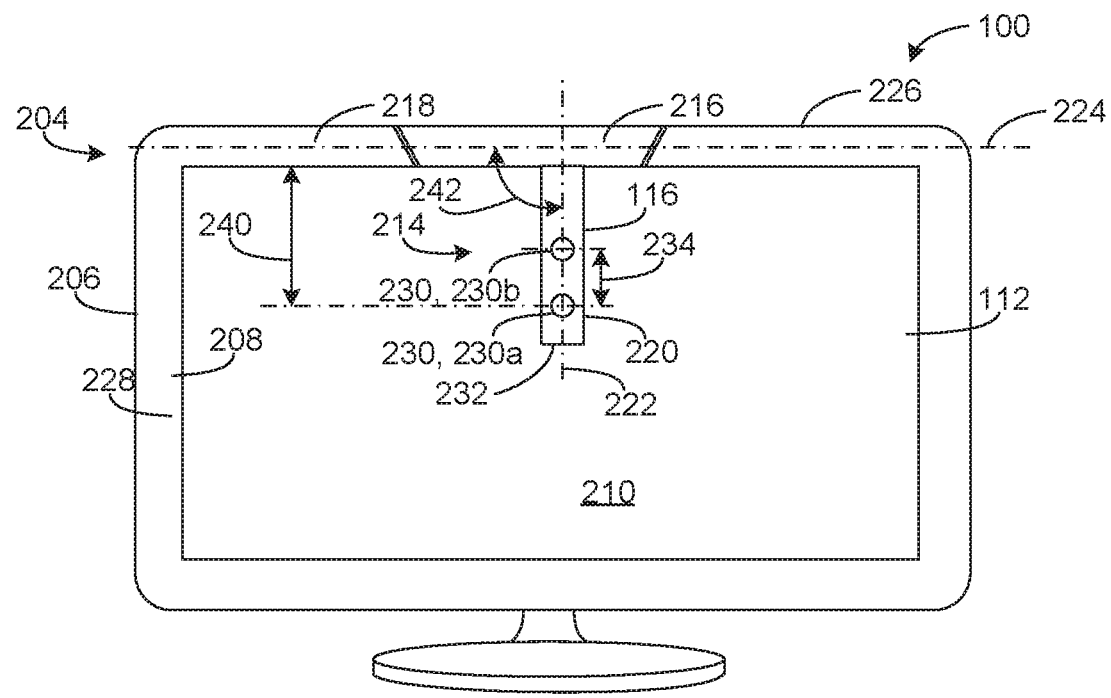
FIG. 2B illustrates the example display of FIG. 2A with the example calibration device shown in a calibration condition.

FIGS. 2A and 2B illustrate an example implementation of the example display 100 of FIG. 1. FIG. 2A illustrates the example display 100 with the calibration device 116 in a non-calibrating condition 202. FIG. 2B illustrates the example display 100 of FIG. 1 with the calibration device 116 shown in a calibration condition 204. Referring to FIGS. 2A and 2B, the display 100 of the illustrated example is a monitor that includes the display panel 112 (e.g., an LCD panel) mounted in a housing 206. The housing 206 of the illustrated example forms a bezel 208 around (e.g., a perimeter of) a viewing area 210 of the display panel 112.

The calibration device 116 of the illustrated example is deployable or movable between a first position 212 (e.g., a non-calibration position) as shown for example in FIG. 2A, and a second position 214 (e.g., a calibration position) as shown for example, in FIG. 2B. In the non-calibrating condition 202, the calibration device 116 of the illustrated example is nested behind a first portion 216 (e.g., an offset portion) of the bezel 208. For example, the calibration device 116 of the illustrated example is not positioned in front of and/or does not obstruct the viewing area 210 of the display 100. For example, the calibration device 116 of the illustrated example is positioned within the housing 206 or positioned (e.g., hidden) behind the bezel 208 of the display 100 when the calibration device 116 is in the first position 212. In other words, when the calibration device 116 of the illustrated example is in the first position 212, the calibration device 116 is not visible to a user when the user is viewing the viewing area 210 of the display 100. Thus, although the calibration device 116 of the illustrated example is integrally formed with the display 100, the calibration device 116 of the illustrated example does not obstruct the viewing area 210 of the display panel 112 when the calibration device 116 is not in use (e.g., is in the first position 212). To enable the calibration device 116 to deploy from within the housing 206 and/or from behind the front portion 216 of the bezel 208, the front portion 216 of the bezel 208 of the illustrated example protrudes away from a second portion 218 (e.g., see FIG. 3A). The calibration device 116 of the illustrated example protrudes or extends from the bezel 208 when the calibration device 116 is in the second position 214 (e.g., a deployed position).

The example calibration device 116 of the illustrated example includes a carrier 220 forming a body having a length along a longitudinal axis 222 and a width (e.g., in a direction substantially perpendicular to the longitudinal axis). The length of the carrier 220 of the illustrated example is greater than the width. The carrier 220 of the illustrated example is movably (e.g., rotatably) coupled relative to the housing 206. In the first position 212, the longitudinal axis 222 of the carrier 220 of the illustrated example is substantially parallel relative to horizontal 224 (e.g., a longitudinal axis of an upper frame 226 of the bezel 208). In the second position 214, the longitudinal axis 222 of the carrier 220 is non-parallel (e.g., substantially perpendicular) relative to the upper frame 226 of the bezel 208 (e.g., the longitudinal axis 222 is horizontal relative to a side surface 228 of the housing 206). Although the carrier 220 of the illustrated example is shown with the longitudinal axis 222 in a non-parallel (e.g., perpendicular) orientation relative to horizontal 224 (e.g., the upper frame 226 in the orientation of FIG. 2B), the carrier 220 may be positioned at other orientations relative to the upper frame 226. For example, the carrier 220 of the illustrated example may be positioned such that the longitudinal axis 222 of the carrier 220 is substantially parallel relative to horizontal 224 when the carrier 220 is in the second position 214 (e.g., the calibration position) and the first position 212 (e.g., the non-calibration position). In some such examples, the carrier 220 may be deployed via a slide mechanism.

To measure color settings presented by the display panel 112 during calibration, the calibration device 116 of the illustrated example includes calibration sensors 230. For example, the calibration device 116 of the illustrated example includes a first calibration sensor 230a and a second calibration sensor 230b. In some examples, the calibration device 116 includes one calibration sensor 230 or more than two calibration sensors 230. The carrier 220 of the illustrated example supports or holds the calibration sensors 230. More specifically, the first calibration sensor 230a of the illustrated example is positioned adjacent a distal end 232 of the carrier 220 and the second calibration sensor 230b of the illustrated example is positioned adjacent the first calibration sensor 230a. For example, the first calibration sensor 230a is spaced from the second calibration sensor 230b by a distance 234 (e.g., between approximately 0.5 inches (1.27 centimeters) and 1 inch (2.54 centimeters)). In the second position 214, the carrier 220 of the illustrated example positions the first sensor 230a a distance 240 (e.g., approximately between 2 inches (5.08 centimeters) and 3 inches (7.62 centimeters) from the upper frame 226 or the bezel 208. In some examples, the calibration device 116 may include only one calibration sensor 230 or more than two calibration sensors 230.

In some examples, the calibration sensors 230 of the calibration device 116 of the illustrated example may be positioned relative to the display panel 112 between the first position 212 and the second position 214. For example, the carrier 220 of the illustrated example may position the calibration sensors 230 at an angle 242 relative to horizontal 224. For example, the carrier 220 of the illustrated example may position the calibration sensors 230 between a zero-degree angle relative to the horizontal 224 (e.g., relative to the upper frame 226) when the carrier 220 is in the first position and a 90-degree angle relative to horizontal 224 when the carrier 220 is in the second position 214.

To calibrate the display 100, the carrier 220 is deployed to the second position 214. At the second position 214, the carrier 220 of the illustrated example positions the calibration sensors 230 relative to the viewing area 210 such that the angle 242 between the longitudinal axis 222 of the carrier 220 and horizontal 224 is a 90-degree angle. In the illustrated example, the carrier 220 remains in the second position 214 during the calibration process. In some examples, during calibration, the angle 242 between the longitudinal axis 222 of the carrier 220 and horizontal 224 is between 10 degrees and 90 degrees. In some examples, the carrier 220 may position the calibration sensors 230 between, for example, 10 degrees and 90 degrees relative to horizontal 224 during the calibration process. For example, the carrier 220 can move to different positions (e.g., increments of 5 degrees) between 10 degrees and 90 degrees relative to horizontal 224 during a calibration cycle.

During calibration of the display 100, the calibration sensor 230a and/or the calibration sensor 230b obtains a plurality of readings for color setting(s) presented by the calibration module 114 over a duration or period of time (e.g., between approximately 10 milliseconds and 50 milliseconds). In this example, the calibration module 114 specifies a number of patterns (e.g., between approximately 10 patterns and 30 patterns) to be presented during calibration, the color settings (e.g., greyscales) of the pattern, the number of readings (e.g., between 5 and 7 readings) per color setting, the frequency of the readings (e.g., every 5 milliseconds), and/or a duration for measuring the color setting (e.g., 50 milliseconds). In some examples, a user may define (e.g., via the user interface 122) the number of patterns, the color settings to be calibrated, the number of readings and/or the duration of readings for corresponding ones of the color settings to be measured.

In the illustrated example, the values measured for corresponding ones of the color settings by the first calibration sensor 230a and/or the second calibration sensor 230b are averaged during calibration to increase calibration accuracy. In some examples, only the calibration sensor 230a obtains a plurality of readings for corresponding ones of the color settings. In some examples, both the calibration sensors 230a and 230b obtain a plurality of readings of the color setting(s) presented during calibration. For example, the calibration sensors 230a and 230b obtain or measure a plurality of readings for corresponding ones of the color settings at the same location and/or at two or more different (e.g., adjacent) locations on the display panel 112. In some examples, the calibration sensors 230a and 230b obtain or measure the plurality of readings simultaneously at the two or more different locations on the display 100. In some examples, the calibration sensors 230 of the illustrated example obtain a plurality of measurements at the different increments or positions (e.g., between 0 degrees and 90 degrees relative to horizontal 226) and the calibration system 102 of the illustrated example averages the plurality of measurements for the measured color setting. In some examples, the second sensor 230b may be employed as a back-up sensor if the first calibration sensor 230a fails (e.g., becomes damaged).

The calibration sensors 230 of the illustrated example are built-in calibration sensors (e.g., colorimeter, an XYZ with color filters, etc.). In the illustrated example, the sensors are tristimulus colorimeters that measure a plurality of spectral energy readings along the visible spectrum by using filtered photodetectors (e.g., photodiodes). For example, the sensors may employ color filters to provide the color matching. In some examples, the calibration sensors 230 may directly contact or engage (e.g., an outer surface) of the viewing area 210 of the display panel 112. In some examples, the calibration sensors 230 may be spaced from the viewing area 210 of the display panel 112 such that the calibration sensors 230 do not directly contact or engage the viewing area 210 of the display 100. In some examples, the first calibration sensor 230a may be in direct contact with the viewing area 210 and the second calibration sensor 230b may be spaced from (e.g., not in contact with) the viewing area 210.

Figure 3A:
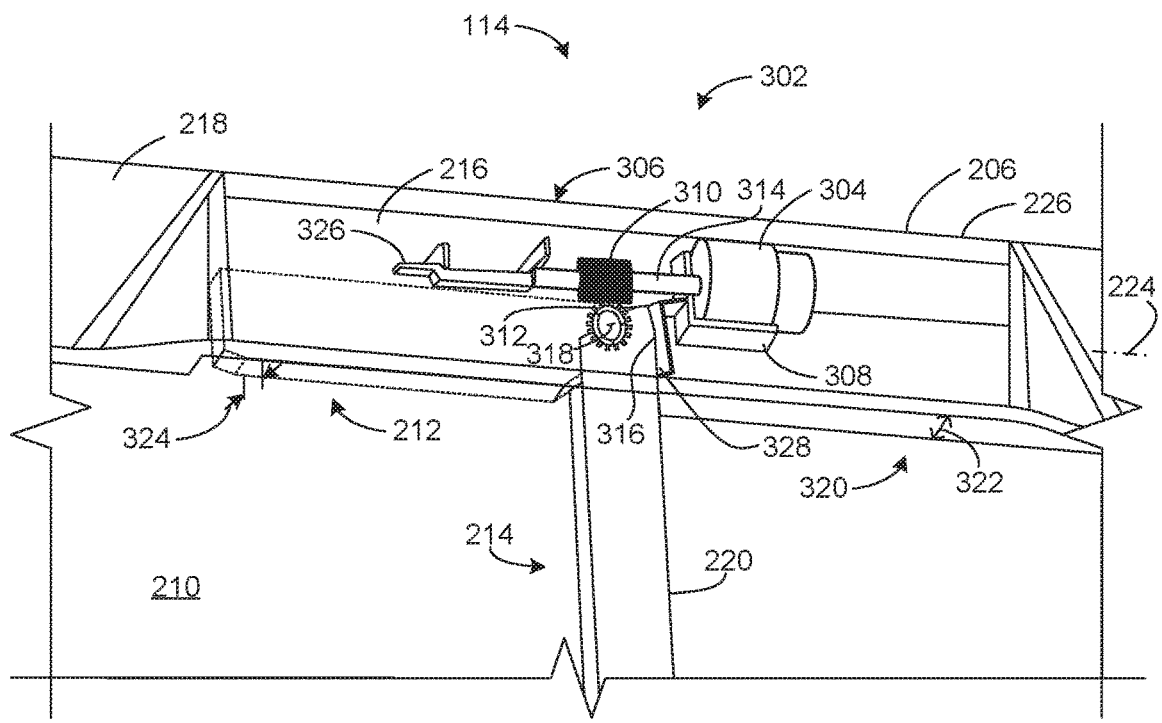
FIG. 3A illustrates a portion of an example drive system of the example calibration device of FIGS. 2A and 2B.

FIG. 3A illustrates a portion of the example display 100 of FIGS. 2A and 2B. Although the housing 206 of the display 100 of FIG. 1 may not be transparent, the housing 206 in FIG. 3A is shown as transparent for purposes of illustration. Further, the carrier 220 of the example calibration device 116 is shown as dashed lines in the first position 212 relative to the housing 206 and is shown in solid lines in the second position 214 relative to the housing 206. To move or drive the calibration device 116 (e.g., the carrier 220) of the illustrated example between the first position 212 and the second position 214, the example calibration device 116 employs a drive system 302. The drive system 302 of the illustrated example includes a motor 304 operatively coupled to the carrier 220 via a transmission 306. The motor 304 of the illustrated example is coupled to the housing 206 via a motor support or support frame 308.

The transmission 306 of the illustrated example is a gear train that includes a worm gear 310 enmeshed with spur gear 312. The worm gear 310 of the illustrated example is coupled to an output shaft 314 of the motor 304 and the spur gear 312 coupled or formed in a proximal end 316 of the carrier 220. In turn, the worm gear 310 of the illustrated example drives the spur gear 312, which causes the carrier 220 to rotate or pivot relative to the housing 206 or the bezel 208 about a rotational axis 318 that is substantially perpendicular relative to the viewing area 210 of the display 100. The worm gear 310 of the illustrated example enables precise positioning of the carrier 220 at the angle 242 (e.g., between zero degrees and 90 degrees) relative to horizontal 224. Further, to provide the housing 206 with a low profile (e.g., a smaller dimensional footprint), a longitudinal axis of the output shaft 314 is parallel relative to horizontal 224 (e.g., the upper frame 226) and the rotational axis 318 of the spur gear 312 is oriented substantially perpendicular relative to a longitudinal axis of the output shaft 314. In some examples, the transmission 306 may include a rack and pinion, belts, pulleys, clutches, and/or other drive configurations. For example, the transmission may include a rack and pinion configuration where the rack is driven by a servo motor to drive a pinion coupled to the carrier 220.

To enable the calibration device 116 to nest, or deploy from, within the housing 206 and/or the front portion 216 of the bezel 208, the housing 206 of the illustrated example includes a passageway or opening 320 (e.g., a pocket). To form the opening 320 in the housing 206, the front portion 216 of the bezel 208 of the illustrated example protrudes away from the second portion 218 by a dimensional distance 322 that is at least greater than a dimensional thickness 324 of the carrier 220. As shown in FIG. 3A, the opening 320 is dimensioned to receive (e.g., house) the calibration device 116. More specifically, the carrier 220 is positionable in the opening 320 without interference from the housing 206.

To achieve feed-back control of the motor 304, the drive system 302 of the illustrated example employs a first limit switch 326 and a second limit switch 328. For example, to interrupt power to the motor 304 when the carrier 220 is at the first position 212, the example drive system includes the first limit switch 326. The first limit switch 326 of the illustrated example stops movement of the carrier 220 beyond the first position 212. To interrupt power to the motor 304 when the carrier 220 is at the second position 214, the drive system 302 of the illustrated example includes the second limit switch 328. Thus, the second limit switch 328 of the illustrated example stops movement of the carrier 220 beyond the second position 214. In some examples, the drive system 302 may include mechanical stops, momentary-contact switches, optical switches and/or any other suitable feed-back device(s). In some examples, the drive system 302 may employ an encoder to determine an angular position (the angle 242 of FIG. 2B) of the carrier 220 between the first position 212 and the second position 214. For example, the calibration device 116 may employ an encoder to stop the motor 304 when the carrier 220 (e.g., the longitudinal axis 222 of the carrier 220) is at the desired angle (e.g., a 45-degree angle) relative to horizontal 224.

Figure 3B:
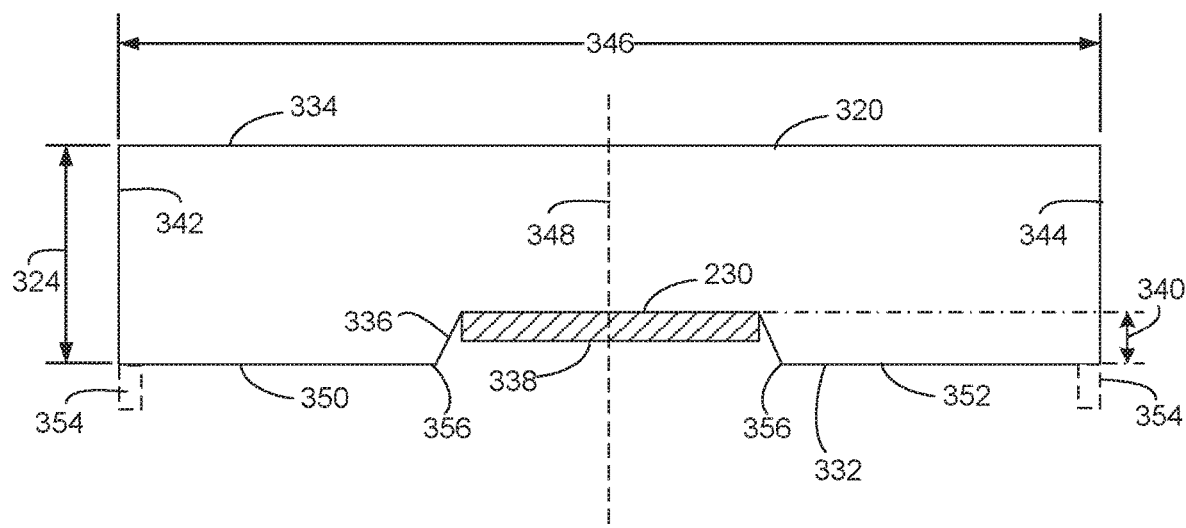
FIG. 3B is a cross-sectional view of an example carrier of the example calibration device of FIGS. 2A and 2B.

FIG. 3B is a cross-sectional view of the carrier 220 of FIGS. 2A, 2B and 3A. The carrier 220 of the illustrated example has a dimensional thickness 324 defined by a front surface 332 and a rear surface 334 opposite the front surface 332. The calibration sensor 230 of the illustrated example is coupled to the carrier 220 such that a sensing surface 338 of the calibration sensor 230 is oriented toward the front surface 332. The front surface 332 of the illustrated example is to face or orient toward the viewing area 210 (FIG. 2A) of the display panel 112 when the calibration device 116 is in the second position 214 (e.g., a calibration condition as shown in FIG. 2B). To help prevent stray ambient light in the environment of the display 100 (e.g., light in a room in which the display 100 is positioned) from reaching the calibration sensor 230 (e.g., and affecting the accuracy of the calibration sensor 230), the calibration sensor 230 is positioned in an opening 336 formed in the front surface 332 of the carrier 220. When positioned in the opening 336, the sensing surface 338 of the calibration sensor 230 of the illustrated example is offset or recessed relative to the front surface 332 by a distance 340 (e.g., between ⅛ inch and ½ of an inch). In this manner, the front surface 332 shields the sensing surface 338 to help prevent stray ambient light in the environment from reaching the calibration sensor 230 during calibration. In some examples, the sensing surface 338 of the calibration sensor 230 may be flush or aligned with the front surface 332 of the carrier 220. In some examples, the sensing surface 338 of the calibration sensor 230 may protrude from (e.g., extend away from) the front surface 332 of the carrier 220 in a direction away from the rear surface 334 (e.g., toward the viewing area 210 of the display panel 112). Additionally, the carrier 220 of the illustrated example includes a first side surface 342 and a second side surface 344 opposite the first side surface 342 defining a dimensional width 346 of the carrier 220. To help reduce stray ambient light from reaching the calibration sensor 230, the calibration sensor 230 is positioned at approximately a midpoint 348 of the width 346 of the carrier 220. In this manner, a first portion 350 of the front surface 332 and a second portion 352 of the front surface 332 shield the calibration sensor 230 from stray ambient light. Additionally, or alternatively, in some examples, a shield 354 (e.g., felt, a rubber piece, etc.) may be positioned along at least a length of the front surface 332 adjacent the first side surface 342 and/or the second side surface 344 to shield the calibration sensor 230 from stray ambient light. In some examples, the shield 354 may be provided along at least a portion 356 (e.g., a corner) of the front surface 332 adjacent the opening 336. The carrier 220 and/or the shield 354 may be composed of a plastic material, a rubber material, felt and/or any other suitable material.

Figure 4A:
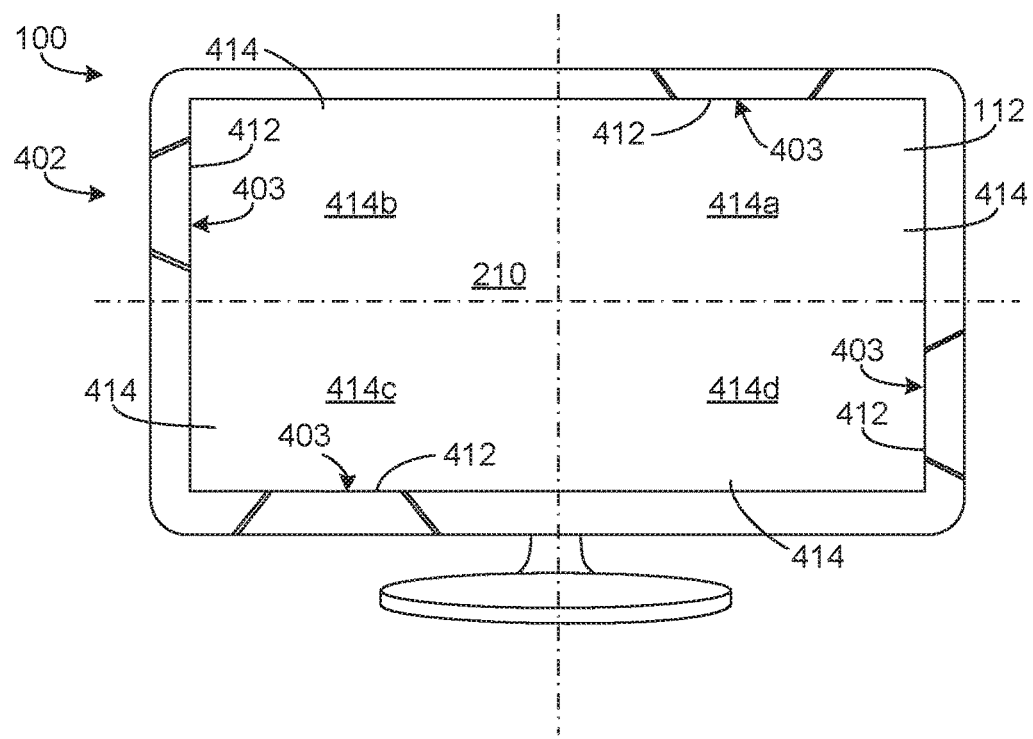
FIG. 4A is another example implementation of the example display of FIG. 1 having a plurality of example calibration devices shown in a non-calibration condition.
Figure 4B:
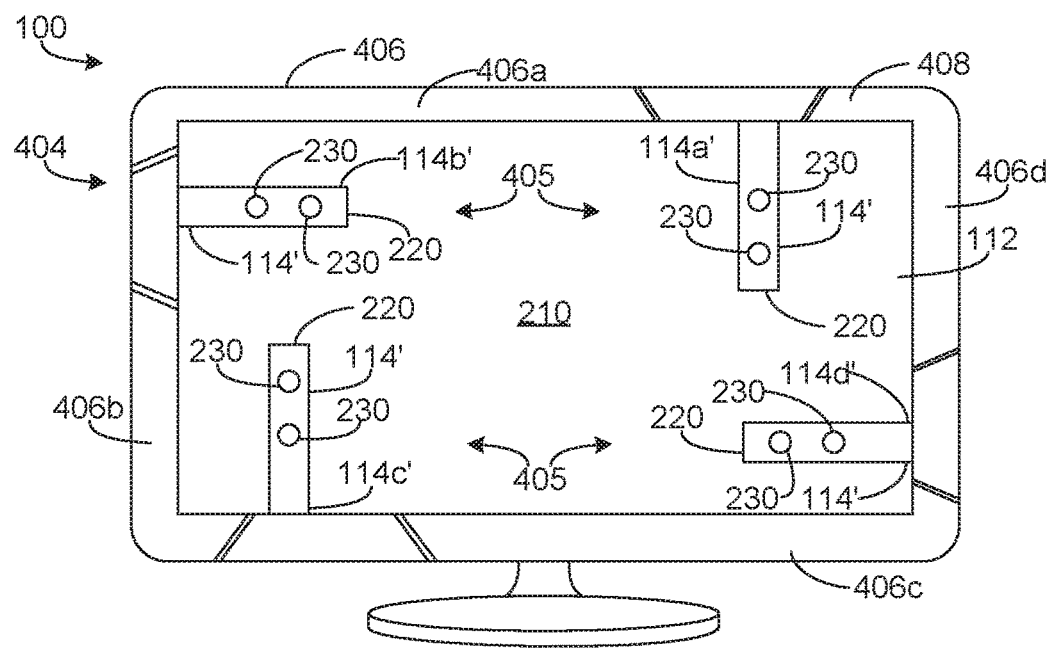
FIG. 4B illustrates the example display of FIG. 4A with the plurality of calibration devices shown in a calibration condition.

FIGS. 4A and 4B illustrate another example implementation of the example display 100 of FIG. 1. The display 100 of the illustrated example is shown in a non-calibration condition 402 in FIG. 4A and shown in a calibration condition 404 in FIG. 4B. The calibration system 102 of the illustrated example includes a plurality of calibration devices 116' deployable between a first position 403 (e.g., a non-calibration position) as shown for example in FIG. 4A, and a second position 405 (e.g., a calibration position) as shown for example, in FIG. 4B. The calibration devices 116' of FIGS. 4A and 4B are substantially similar or identical to the calibration device 116 of FIGS. 1, 2A, 2B, 3A and 3B. Those components of the example calibration device 116' of FIGS. 4A and 4B that are substantially similar or identical to the components of the calibration device 116 of FIGS. 1, 2A, 2B and 3 described above and that have functions substantially similar or identical to the functions of those components will not be described in detail again below. Instead, the interested reader is referred to the above corresponding descriptions. To facilitate this process, similar reference numbers will be used for like structures. For example, the calibration devices 116' of the illustrated example include a carrier 220, a longitudinal axis 222, a drive system 302, and calibration sensors 230, 230a, 230b that are similar or identical to the calibration device 116 of FIGS. 1, 2A, 2B, 3A and 3B.

Referring to FIGS. 4A and 4B, the display 100 of the illustrated example is a monitor that includes a display panel 112 (e.g., an LCD panel) that is mounted in a housing 406. The housing 406 of the illustrated example forms a bezel 408 around a viewing area 210 of the display panel 112. In the non-calibration condition 402, the calibration devices 116' are not positioned in front of and/or do not obstruct a viewing area 210 of the display 100. For example, the calibration devices 116' of the illustrated example are positioned with in the housing 406 or (e.g., hidden) behind the bezel 408 of the display 100 when the calibration devices 116' are in the first position 402 as shown in FIG. 4A. In other words, when the display 100 of the illustrated example is in the non-calibration condition 402, the calibration devices 116' of the illustrated example are not visible to a user when the user is viewing the viewing area 210 of the display 100. For example, the bezel 408 of the illustrated example includes openings 412 (e.g., pockets) to enable the calibration devices 116' to be positioned behind the bezel 408 and/within the housing 406. For example, as shown in FIG. 4B, the calibration devices 116' of the illustrated example deploy from within the housing 406 and/or behind the bezel 408 and (e.g., the carriers 220 of the respective calibration devices 116') at least partially protrude from the bezel 408 when the display 100 of the illustrated example is in the calibration condition 404 (e.g., FIG. 2B).

The example calibration devices 116' of the illustrated example enable calibration of different area or zones 414 of the display 100. For example, a first calibration device 116a' is provided in a first zone 414a (e.g., a first quadrant) of the viewing area 210, a second calibration device 116b' of the illustrated example is provided in a second zone 414b (e.g., a second quadrant) of the viewing area 210, a third calibration device 116c' of the illustrated example is provided in a third zone 414c (e.g., a third quadrant) of the viewing area 210, and a fourth calibration device 116d' of the illustrated example is provided in a fourth zone 414d (e.g., a fourth quadrant). For example, in the orientation of FIGS. 4A and 4B, the first calibration device 116a' moves relative to an upper frame 406a of the housing 406, the second calibration device 116b' moves relative to a left side frame 406b of the housing 406, the third calibration device 116c' moves relative to a lower frame 406c of the housing 406, and the fourth calibration device 116d' moves relative to a right side frame 406d of the housing 406.

The first and third calibration devices 116a' and 116c' rotate (e.g., are positionable) between zero degrees (e.g., horizontal) and 90 degrees (e.g., perpendicular) relative to the respective upper frame 406a and the lower frame 406c. The second and third calibration devices 116b' and 116d' rotate (e.g., are positionable) between zero degrees (e.g., horizontal) and 90 degrees (e.g., perpendicular) relative to respective left side frame 406b and the right side frame 406d. Each of the upper frame 406a, the lower frame 406c, the left side frame 406b and the right side frame 406d includes an opening (e.g., similar to the opening 320 of FIG. 3A) formed via the bezel 408 to receive the respective calibration devices 116'.

The carrier 220 of the calibration devices 116' of the illustrated example supports the calibration sensors 230. The calibration sensors 230 of the illustrated example are colorimeters (e.g., xyz sensors with color filters). In some examples, each calibration device 116' may support one sensor or more than two sensors. The calibration devices 116' measure or obtain readings from the viewing area 210 of the respective zones 414a-d. In some examples, the calibration devices 116' can measure or obtain color setting readings at different zones 414a-d of the display 100 (e.g., simultaneously) during calibration. For example, the calibration devices 116' can measure color setting values at two adjacent locations of the viewing area 210 in corresponding ones of the zones 414a-d. In some examples, a color setting may be calibrated to different target values in the different zones 414a-d. The values obtained from the different zones for corresponding ones of the color settings measured may be averaged during calibration. In some examples, the calibration devices 116' of the illustrated example determine if there is color and/or luminance deviation between the different zones 414, between an upper half of the viewing area 210 (e.g., the first and second zones 414a and 414b) and a lower half of the viewing area 210 (e.g., the third and fourth zones 414c and 414d), and/or between a left side of the viewing area 210 (e.g., the second and third zones 414b and 414c) and a right side of the viewing area 210 (e.g., the first and fourth zones 414a and 414d).

FIG. 5 is a block diagram illustrating an example implementation of the example calibration system 102 that may be used to implement the example display 100 of FIGS. 1, 2A, 2B, 3, 4A and/or 4B. As noted above, the calibration system 102 of the illustrated example creates look-up tables for color calibration as part of the calibration process instead of simply utilizing (e.g., modifying) a pre-set look-up table that may not represent the capabilities of the display 100. For example, some calibration solutions implement a simple luminance set of readings for calibration purposes. In contrast, the calibration system 102 of the illustrated example generates a new set of look-up tables at each calibration.

Referring to FIG. 5, the calibration module 114 of the illustrated example includes an example calibration initiator 502, an example calibration device driver 504, an example calibration manager 506, an example data aggregator 508, an example calibration parameter determiner 510, an example validator 512, an example pattern generator 514, and an example data store 516, which are in communication via a communication bus 520.

The calibration initiator 502 of the illustrated example initiates the calibration manager 506 to perform a calibration of the display panel 112. The calibration initiator 502 of this example is communicatively coupled to the user interface 122 and/or the data store 108 of FIG. 1. The calibration initiator 502 of the illustrated example can receive either manual instructions to initiate a calibration or can automatically initiate calibration without assistance from a person. For example, the calibration initiator 502 receive instructions manually from a user (e.g., a manual input) via the user interface 122 or automated instructions from the data store 108 that causes the calibration manager 506 to calibrate the display 100. For example, the data store 108 may include a schedule (e.g., a date and a time) to initiate calibration (e.g., every Sunday at noon). In some examples, the data store 108 may include an event trigger to initiate calibration such as, for example, a number of in-use hours of the display 100 since a calibration was last performed. The calibration initiator 502 of the illustrated example may be configured via the user interface 122 to initiate calibration after every 250 hours that the display 100 is in use. In some examples, during an automated calibration process, the example calibration initiator 502 causes the display 100 to power up and begins calibration after a warm-up period (e.g., after a certain duration, such as 30 minutes). Allowing the display to warm up allows the backlighting of the display to stabilize. In some examples, the warm-up period is determined after expiration of a threshold time (e.g., after a half-hour). In some examples, the calibration initiator 502 may receive calibration instructions remotely through a remote management system communicatively coupled (e.g., via wireless connection, a wired connection, an Internet protocol, a network, etc.) to the calibration initiator 502. Calibration data may be collected and/or analyzed via the remote management system before and/or after calibration. In some such examples, the user interface 122 may receive notification from the remote management system prior to calibration, which can be overridden by the user via, for example, the user interface 122.

The calibration manager 506 of the illustrated example is communicatively coupled to the calibration device driver 504. When the calibration initiator 502 initiates a calibration, the calibration device driver 504 of the illustrated example controls the drive system 302 (e.g., operates the motor 304) of the respective calibration devices 116 or 116'. For example, the calibration device driver 504 causes the calibration device 116 of FIGS. 2A and 2B to move between the first position 212 and the second position 214 as illustrated, in FIGS. 2A and 2B. In the second position 214, the calibration sensors 230 of the calibration device 116 are positioned to measure light output characteristics presented by the display panel 112. Likewise, the calibration device driver 504 causes the calibration devices 116' of FIGS. 4A and 4B to move to the calibration condition 404 to measure light output characteristics in the different zones 414a-d of the display panel 112 of FIGS. 4A and 4B.

Additionally, the calibration manager 506 of the illustrated example receives calibration parameters from the calibration parameter determiner 510. The calibration parameter determiner 510 retrieves from the data store 516 preset color space information or settings that the display 100 is to calibrate or match. In some examples, the calibration parameters may include settings for preset color primaries, gamma curve, and/or luminance. For example, standard or preset color space values may include, for example, sRGB D65, sRGB D50, AdobeRGB, BT.709, BT.2020 and Native primaries of the display. Gamma curve values may include values of 1.0 to 3.0 (e.g., typical values are between 2.2 and 2.6). In some examples, settings (e.g., a color setting) of the standard presets may be user modified and/or a user may pre-define different presets (e.g., via the user interface 122). For example, a user may adjust a green color value to be darker than a green color value of a standard preset (e.g., an sRGB standard preset). In some examples, the color space information may be provided to the data store 508 via the remote management system.

To calibrate the display 100, the calibration manager 506 of the illustrated example commands the pattern generator 514 to generate patterns displaying a plurality of color settings associated with the selected color space information on the display panel 112. For example, the patterns generated by the pattern generator 514 may be based on the selected standard preset color space, gamma curve and/or luminance. For example, patterns generated by the pattern generator 514 may include fields or windows of a color (e.g., primary colors and secondary colors), grayscale, or luminance. For instance, the plurality of patterns (e.g., 30 patterns) may be displayed (e.g., one after the other including, for example, red, green, blue, full black to full white, greyscale values, etc.) that change in measured increments (5 percent increments, 10 percent increments, etc.). The pattern generator 514 of this example controls red, green and blue color outputs of the display panel 112 via, for example, the display driver 110 of FIG. 1. The color patterns are provided by adjusting red level, green level, blue level, and brightness levels of the LEDs of the display panel 112.

When the patterns are generated, the calibration sensors 230 of the illustrated example measure or obtain a plurality of readings for corresponding ones of the color settings and/or luminance levels presented by the generated patterns. The patterns generated may include displaying a plurality of different color settings (e.g., primary colors, secondary colors, greyscale), white point values and/or brightness values. For example, the patterns generated may include images or patterns presented on the viewing area 210 of the display panel 112 to enable the calibration sensors 230 to measure tristimulus values for the primary colors and tristimulus values for the greyscales, where the tristimulus values include X, Y, Z stimulus values, the greyscales include values of greyscale 0-255 and the primaries include red (R255), green (G255) and blue (B255) values.

The calibration sensors 230 of the illustrated example obtain a plurality of specified measurements or readings (e.g. 10 readings) over a specified period (e.g., 50 milliseconds) for corresponding ones of the color settings. In some examples, the calibration sensor 230 measures the plurality of readings at the same location of the viewing area 210 of the display 100. In some examples, the calibration sensors 230 measure the color setting readings at different locations on the viewing area 210 of the display 100. In some examples, the calibration sensors 230 measure different color setting readings at different locations on the viewing area simultaneously. In some examples, the patterns generated by the pattern generator 514 may include a standard set of patterns to be measured with the back-light turned on and repeating the measurement of the standard set of patterns to be measured with the back-light turned off (e.g., in scenarios where stray ambient light should be removed from the calibration measurements).

The signals from the calibration sensors 230 of the illustrated example are communicated to the data aggregator 508. The signals provided to the data aggregator 508 by the calibration sensors 230 may include raw data relating to the light energy or light wave characteristic(s) of the measured color settings. The data aggregator 508 receives the measured values (e.g., the plurality of measured value to be averaged) for corresponding ones of the color settings and/or luminance levels analyzed. In some examples, the data aggregator 508 includes a signal identifier to identify the signals measured for corresponding ones of the color settings and/or luminance. In other words, in some examples, the data aggregator 508 identifies and segregates the sensor readings associated with the corresponding ones of the color settings that are to be averaged for use by the calibration manager 506. In some examples, the data aggregator 508 converts the raw data to computer processable electronic signals, that can be used to determine measured values of the analyzed color settings. The data aggregator 508 of the illustrated example calculates an average value of the measured values obtained for respective ones of the color setting(s) and/or luminance level(s). Thus, the data aggregator 508 calculates a respective average value for corresponding ones of the color settings presented by the pattern generator 514.

The data aggregator 508 of the illustrated example communicates the average values for the color settings measured by the calibration sensors 230 to the calibration manager 506. The average measured values may be representative of color tones (e.g., primary colors, secondary colors), white points and/or brightness (e.g., luminance and greyscale) that are used by the calibration manager 506 during a calibration process. The calibration manager 506 of the illustrated example determines an input-to-output correction of the display 100 by generating correction look-up tables (pre-LUT, a 3×3 matrix and a post-LUT) to optimize the output color setting and/or luminance (e.g., grayscale presentation) of the display 100. For each calibration performed, the calibration manager 506 of the illustrated example generates input-to-output correction look-up tables (e.g., calibrated measured values). For example, the calibration manager 506 of the illustrated example employs the average value of the readings for the corresponding color setting and/or luminance setting an input value for calibration processes that are used during a calibration process. Thus, the calibration module 114 of the illustrated example determines calibrated measurement values based on the average values determined by the data aggregator 508. In some instances, using average values of measurements provided by the calibration sensors 230 enable compensation for noise (e.g., greyscale noise) or other inaccuracies or inconsistencies that may be inherent in calibration sensors 230 (e.g., colorimeters). For example, the calibration sensors 230 may provide inconsistent or inaccurate readings when measuring white balance or white points, greyscale and/or luminance values. Thus, by calibrating the display 100 using an average value of multiple measurements for the corresponding ones of the color settings and/or luminance pattern measured during calibration, the example methods and apparatus disclosed herein increase calibration accuracy (e.g., by averaging out noise inherent in the calibration sensors 230 or detecting inconsistencies between readings of different calibration sensors 230). In some examples, lower cost sensors may be employed. In some examples, a plurality of brightness levels across different portions of the display panel 112 may be measured simultaneously to determine any inconsistencies in the brightness provided by a backlight of the display 100 across different portions (e.g., the zones 414) of the display panel 112. In some examples, color setting and/or luminance deviation may be determined between zones 414 of the example viewing area 210 of FIGS. 4A and 4B.

The display 100 of the illustrated example employs a native mode as a default color space of a gamut of colors that the native primary colors can reproduce. Without calibration, the display 100 operating in native mode would have no or little color processing performed on the input data 118 of the drive source 120. To provide improved color accuracy, the native primaries of the native mode are corrected for individual differences in gamma with the calibrated correlation tables. For example, calibrated correlation tables may be generated using calibration processes that include, for example, an inverse transform of the measured color space to determine pre-look up tables (pre-LUT), post look up tables (post-LUT) and a matrix multiplier (e.g., a 3×3 multiplier).

For example, some video connections support an 8-bit-per color interface to the video display. Nevertheless, the display 100 of the illustrated example is not limited to just 8-bit color. With a Red-Green-Blue (RGB) set of primaries, this may be called 24-bit (8×3) "True-color" display. The display 100 of the illustrated example may make much more effective use of these 24 bits by performing color space manipulation using extended bit-depth hardware in a linear color space. For instance, these 24 bits are presented to a display in a gamma encoded color space format, such as sRGB, Adobe™ RGB, Rec. 709 (HDTV), SMPTE-C, SMPTE-431-2, or another standard. The calibration manager 506 may take such an encoded format and convert the 24 bits to an extended bit-depth, such as a 36-bit wide (3×12) R'G'B' linear color space. In other words, the calibration manager 506 creates a pre-look up table (pre-LUT) that may be an extended bit-depth linear color space and is a decoded version of the encoded color space presented from the driving source 120. This extended bit-depth R'G'B' linear color space is used to reorder the encoded color space into a set of extended bit-depth R"G"B" linear native color primaries using a 3×3 matrix multiplier. The set of extended bit-depth R"G"B" linear native color primaries are then individually encoded into a set of native encoded primaries having individual tone responses for the display panel 112. That is, each native primary has a unique and likely different tone response used by the display 100. To create this multi-tone response encoding, the native primaries of the display 100 are characterized for their individual chromaticity and actual measured tone response and the data used to provide the 3×3 multiplier coefficients and the multi-gamma encoding look-up tables for the linear primaries to the native primaries.

The measured tone responses of corresponding primaries of the display 100 of the illustrated example are used to program a set of post-LUT tables that convert linear intensity data to the individual panel primary tone response. This multi-primary chromaticity shifting for white point and individual tone response encoding scheme allows the primaries (e.g., red, blue and green) to be reproduced. Essentially, a preferred tone response of the display 100 becomes the tone response used in pre-LUTs to convert the incoming driving source color space as most differences between the display panel 112 primaries have been compensated. In some examples, individual setting of multiple tone responses may be preset or downloaded into the pre-LUT. Such tone responses can include those with simple gamma functions, linear plus gamma with offset (sRGB), and downloadable curves.

Thus, example methods and apparatus disclosed herein perform calibration based on a native response of the display 100. Thus, imperfections in the display 100 are measured and profiled during calibration to compensate for those imperfections. The differences between the colors the display 100 presents in its native state and true colors used during calibration (e.g., associated with the standard color space used during calibration) to create calibration measurement values enable the display 100 to present the true colors associated with the standard color space more closely than the panel presented when in the native state. Thus, the calibrated measurement values (e.g., adjusted or corrected input values) determined by the average values obtained by the calibration sensors 230 enable the display 100 to output color space values that closely match the color settings of the input data 118. Additional description of a suitable calibration process can be found at U.S. Pat. No. 8,654,142.

After the calibrated measurement values are determined by the calibration manager 506, the validator 512 of the illustrated example validates the accuracy of the calibrated measurement values. For example, the validator 512 compares (e.g., via a comparator) the calibrated measurement values with target values retrieved from the data store 516. The target values may include, for example, target color primary colors (red, green, blue), target white point, and/or target luminance values that may be based on CIE xy or CIE u'v' values. The validator 512 compares the calibrated measurement values and the target values until the calibrated measurement values, for each target primary, target white point, and/or target luminance satisfy (e.g., are less than) a threshold. For example, the threshold may be, for example, verification of a tone response for all RGB primaries. For example, the threshold may be a chroma and luminance difference that is measured when red, green and blue primary values are equal (e.g., the threshold may be a chroma difference not more than 3 and a luminance difference not more than 0.6).

When the calibrated measured values are validated by the validator 512, the calibration manager 506 stores the calibrated measured values (e.g., the look-up tables) in the data store 108 for use by the color management system 106 of FIG. 1. Additionally, when the validator 512 determines that the calibrated measurement values meet the threshold, the validator 512 causes the calibration manager 506 to terminate the calibration process. In turn, the calibration manager 506 causes the calibration device driver 504 to move the calibration devices 116, 116' from the calibration conditions 204, 404 (e.g., the second position 214, 405) to the non-calibration condition 202, 402 (e.g., the first position 212, 403).

While an example manner of implementing the calibration system 102 of FIG. 1 is illustrated in FIG. 5, the elements, processes and/or devices illustrated in FIG. 5 may be combined, divided, re-arranged, omitted, eliminated and/or implemented in any other way. Further, the example calibration initiator 502, the example calibration device driver 504, the example calibration manager 506, the example data aggregator 508, the example calibration parameter determiner 510, the example validator 512, the example pattern generator 514, and the example data store 516 and/or, more generally, the example calibration system 102 of FIGS. 1 and 5 may be implemented by hardware, software, firmware and/or any combination of hardware, software and/or firmware. Thus, for example, any of the example the example calibration initiator 502, the example calibration device driver 504, the example calibration manager 506, the example data aggregator 508, the example calibration parameter determiner 510, the example validator 512, the example pattern generator 514, and the example data store 516 and/or, more generally, the example calibration system 102 could be implemented by analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example calibration initiator 502, the example calibration device driver 504, the example calibration manager 506, the example data aggregator 508, the example calibration parameter determiner 510, the example validator 512, the example pattern generator 514, and the example data store 516 is/are hereby expressly defined to include a tangible computer readable storage device or storage disk such as a memory, a digital versatile disk (DVD), a compact disk (CD), a Blu-ray disk, etc. storing the software and/or firmware. Further still, the example calibration system 102 may include elements, processes and/or devices in addition to, or instead of, those illustrated in FIG. 5, and/or may include more than one of any or all of the illustrated elements, processes and devices.

Figure 6:
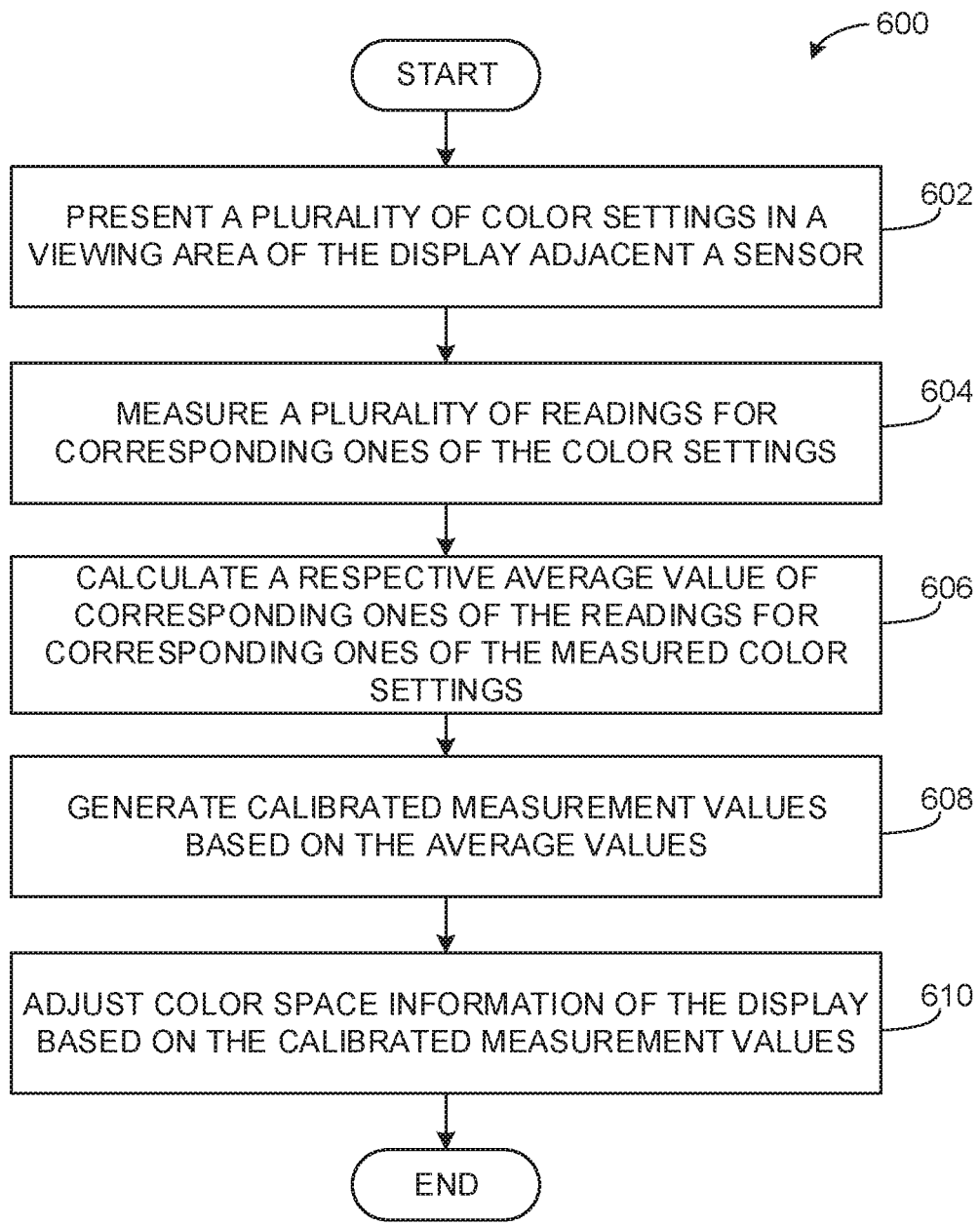
FIGS. 6-8 are flowcharts representative of example machine readable instructions which may be executed to implement the example calibration system of FIG. 5.
Figure 7:
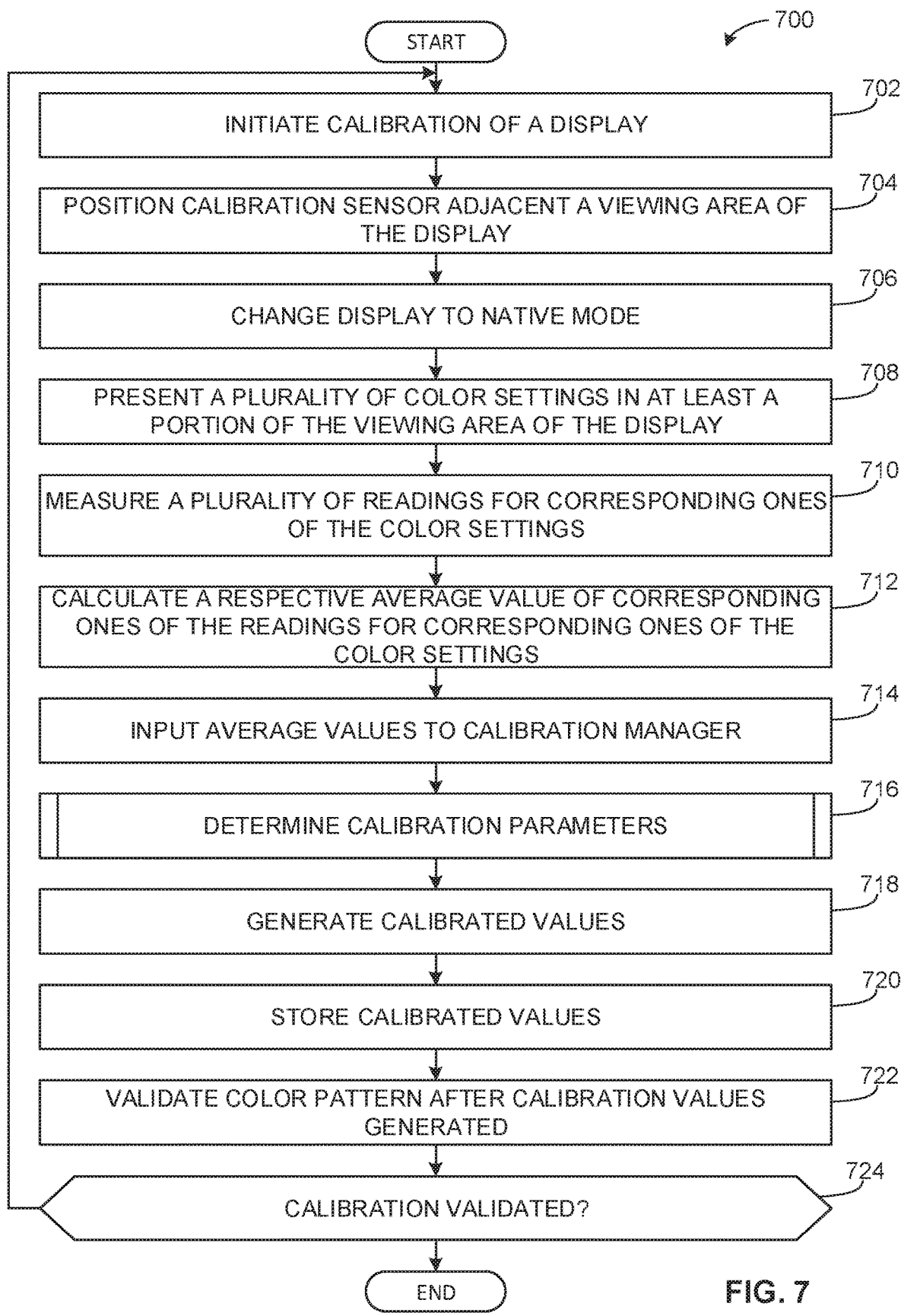
Figure 8:
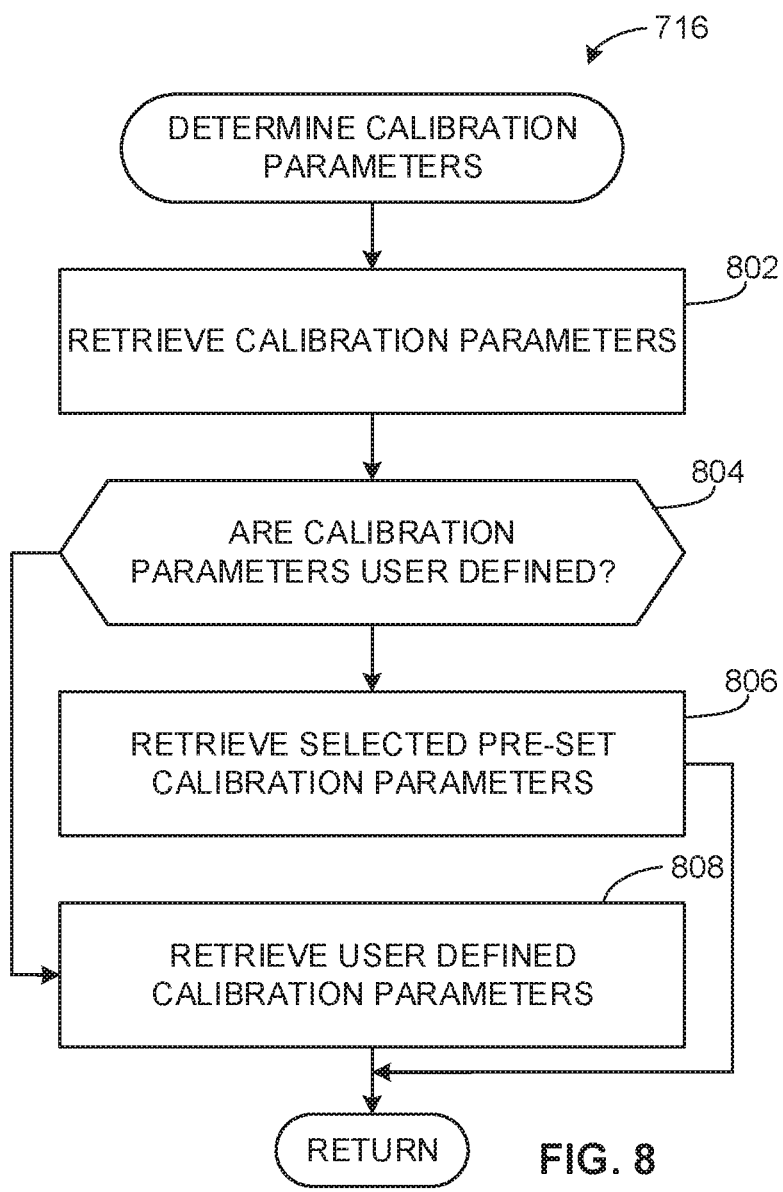

Flowcharts representative of example machine readable instructions for implementing the calibration system 102 of FIGS. 1 and 5 are shown in FIGS. 6-8. In these examples, the machine readable instructions include a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6-8, many other methods of implementing the example calibration system 102 may alternatively be used. For example, the order of execution of the blocks may be changed, and/or some of the blocks described may be changed, eliminated, or combined.

As mentioned above, the example processes of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Referring to FIG. 6, the program 600 of FIG. 6 begins at block 602 when the calibration manager 506 presents a plurality of color settings in the viewing area 210 of the display panel 112 adjacent the calibration sensor(s) 230. The calibration sensor(s) 230 measure a plurality of readings for corresponding ones of the color settings (block 604). For example, the first calibration sensor 230*a* may measure a plurality of readings for the corresponding ones of the color settings presented over a specified duration (e.g., 10 readings, every 5 milliseconds, a plurality of readings over 50 milliseconds, etc.). In some examples, the first calibration sensor 230*a* and the second calibration sensor 230*b* obtain readings at two adjacent areas of the display 100 for each color setting presented by the color patterns. In some examples, the calibration sensors 230 obtain or measure readings in different zones 414*a-d* of the display for corresponding ones of the color readings.

The data aggregator 508 calculates a respective average value of corresponding ones of the readings for corresponding ones of the measured color settings obtained by the calibration sensor(s) 230 (block 606). The calibration manager 506 generates calibrated measurement values based on the average values (block 608). For example, the calibrated measurement values may be look-up tables that can be employed by the color management system 106 of FIG. 1 when adjusting an output of the display 100 to correlate with color space information of the input data 118 received from the drive source 120. The color management system 106 adjusts color space information of the display 100 based on the calibrated measurement values (block 610).

Referring to FIG. 7, the program 700 of FIG. 7 begins at block 702 when the calibration initiator 502 initiates calibration of the display 100. For example, the calibration initiator 502 receives instructions to initiate calibration from the user interface 122 and/or automatically initiates calibration based on instructions retrieved from the data store 108. The calibration initiator 502 initiates the calibration manager 506 to generate look-up tables for use by the color management system 106.

The calibration device driver 504 positions or locates the calibration sensor(s) 230 adjacent the viewing area 210 of the display 100 (block 704). For example, the calibration device driver 504 provides power to the motor 304 of the drive system 302 of FIG. 3A to move the carrier 220 from the first position 212 shown in FIG. 2A to the second position 214 shown in FIG. 2B. When the carrier 220 engages the second limit switch, 328, electric power to the motor 304 is interrupted to stop the carrier 220 at the second position 214. The calibration manager 506 of the illustrated example changes a setting of the display 100 to a native mode or performance (block 706). With the setting of the color space of the display 100 in a native mode, the calibration manager 506 commands the pattern generator 514 to generate or present a plurality of color settings in at least a portion of the viewing area 210 of the display 100 (block 708). For example, the pattern generator 514 causes the display driver 110 to generate patterns that include a plurality of color settings (e.g., primary colors, secondary colors, grayscale, white point, luminance, etc.) in the view area 210 of the display 100.

The calibration sensor(s) 230 measure a plurality of readings for corresponding ones of the color settings (block 710). For example, the calibration sensor(s) 230 obtain a predefined number of readings (e.g., between approximately 5 readings and 10 readings) of a presented color setting over a predetermined period (e.g., 100 milliseconds). For example, the calibration sensor(s) 230 may obtain 10 readings every 10 milliseconds for corresponding ones of the color settings that is presented or that is to be measured for use by the calibration manager 506. In some examples, the calibration sensor 230 obtains the readings from the same position on the viewing area 210 of the display 100. In some examples, the first calibration sensor 230*a* and the second calibration sensor 230*b* obtain a plurality of readings at two adjacent areas of the display 100 for the corresponding ones of the color settings presented by the color patterns and/or in different zone 414*a*-414*d*. The readings provided by the calibration sensors 230*a* and 230*b* may be obtained simultaneously.

The data aggregator 508 receives the plurality of readings from the calibration sensor(s) 230 and calculates a respective average value of corresponding ones of the readings for corresponding ones of the color settings (block 712). The average values measured for corresponding ones of the color settings are provide as inputs to the calibration module 114 or the calibration manager 506 (block 714). The calibration parameter determiner 510 determines the calibration parameters and provides the calibrated parameter values to the calibration manager 506 (block 716). The calibration manager 506 generates calibrated values based on the average values received and the calibrated parameter values (block 718). The calibrated measurement values (e.g., look-up tables) are stored in the data store 516 (block 720). After calibration, the validator 512 validates a color pattern on the display 100 after the calibration values are generated (block 720). For example, the validator 512 provides an input having target color setting values to the pattern generator 510. The pattern generator 510 presents or displays the color setting of the input, but adjusted with the calibration measured values. The calibration sensors 230 measure the color setting on the display 100 that is based on the target color setting values and adjusted by the calibrated measured values. For example, the validator 512 compares, via a comparator, target color setting values with the measured output color setting (e.g., adjusted with the calibrated measured values). Based on this comparison, the validator 512 determines if the calibration is validated (block 724). For example, if the calibrated measured values do not satisfy (e.g., are outside of) a threshold at block 724, the validator 512 determines that the calibrated measured values are not validated and returns to block 702 to initiate further calibration. If the validator 512 determines that the calibrated measured values satisfy (e.g., are less than) a threshold at block 724, the validator 512 confirms validation of the calibrated measurement values and the calibration process ends.

Referring to FIG. 8, the calibration parameters are determined by retrieving calibration parameters from the data store 108 (block 802). When the calibration parameters are retrieved from storage, the calibration parameter determiner 510 determines if the calibration parameters are user defined (block 804). In some examples, the calibration parameter determiner 510 reviews a file name of the preset calibration parameter to determine if the calibration parameter is a standard calibration parameter. If the file name equals any one of a predetermined number of file names, the calibration parameter determiner 510 determines that the calibration parameters are standard (e.g., not user defined). In some examples, the calibration parameter determiner 510 compares color setting values (e.g., primary colors, gamma curve value, luminance value, etc.) with color setting values of standard calibration parameter values to determine if the calibration parameter values in the data store 108 are standard values or user defined values.

If the calibration parameter determiner 510 determines that the calibration parameters retrieved from the data store 108 are not user defined at block 804, the calibration parameter determiner 510 retrieves the selected preset calibration parameters for use by the calibration manager 506 (block 806). If the calibration parameter determiner 510 determines that the calibration parameters retrieved from the data store 108 are user defined at block 804, the calibration parameter determiner 510 retrieves the user defined calibration parameters for use by the calibration manager 506 (block 808).

Figure 9:
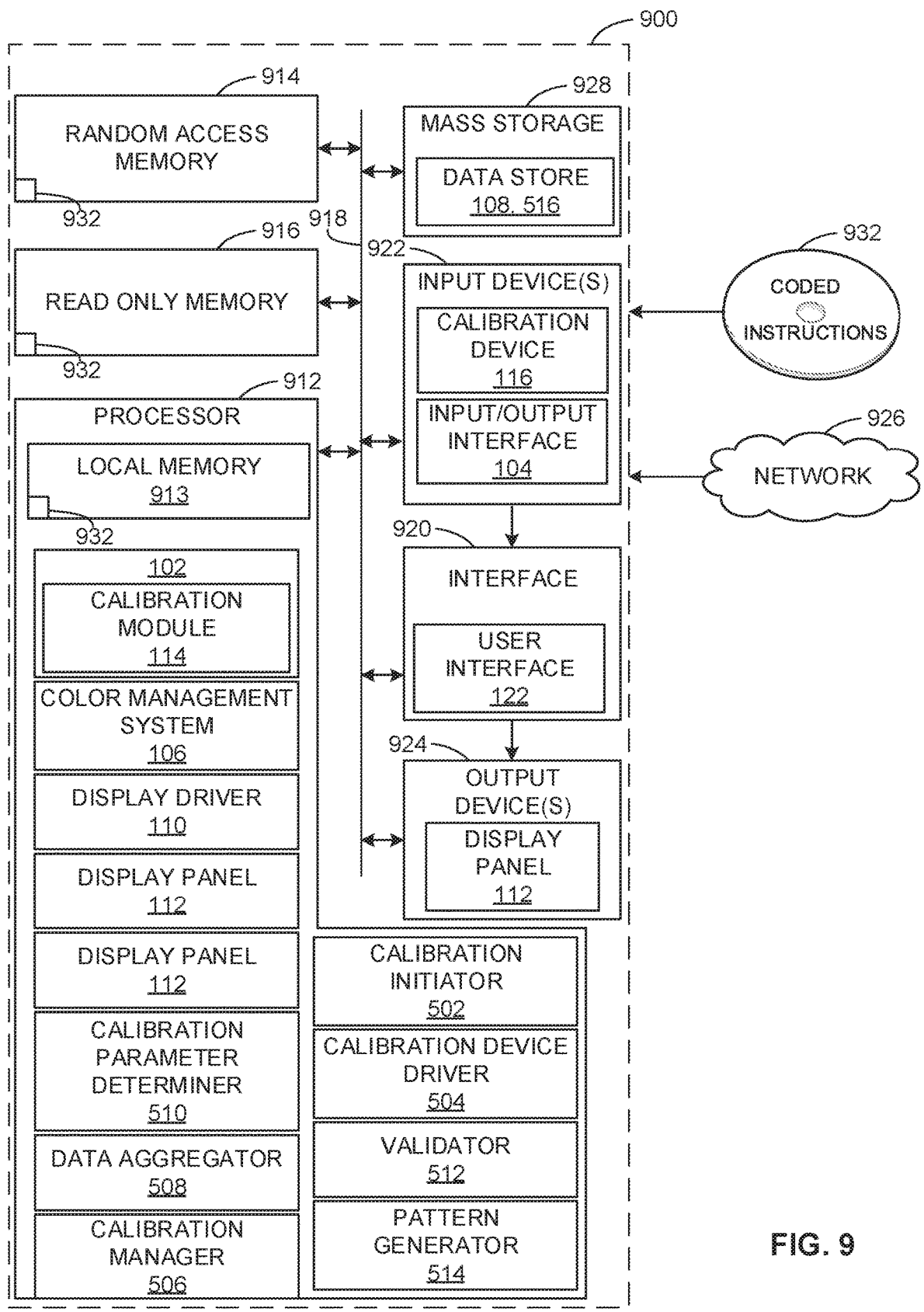
FIG. 9 is a block diagram of an example processor platform capable of executing the instructions of FIGS. 6, 7 and/or 8 to implement the example calibration system of FIG. 5.

FIG. 9 is a block diagram of an example processor platform 1000 capable of executing the instructions of FIGS. 6-8 to implement the calibration module 114 of FIGS. 1 and 5. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by an integrated circuit, a logic circuit, a microprocessor or a controller from any desired family or manufacturer.

The processor 912 of the illustrated example includes a local memory 913 (e.g., a cache). In the illustrated example of FIG. 9, the example processor 912 executes instructions to implement the example calibration system 102, the example color management system 106, the example display driver 110, the example calibration initiator 502, the example calibration device driver 504, the example calibration manager 506, the example data aggregator 508, the example calibration parameter determiner 510, the example validator 512, and the example pattern generator 514.

The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface. In the illustrated example of FIG. 9, the example input circuit 920 may implement the example user interface 122.

In the illustrated example, input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 9, the example input device(s) 922 implement the example input/output interface 104 and the example calibration sensor(s) 230.

Output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor. In the illustrated example of FIG. 9, the example output device(s) 924 implement the example display panel 112.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes a mass storage device 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 6-8 may be stored in the mass storage device 928, in the volatile memory 914, in the non-volatile memory 916, and/or on a removable tangible computer readable storage medium such as a CD or DVD.

From the foregoing, it will appreciate that methods, apparatus and articles of manufacture have been disclosed which provide a display having an integrated calibration system. Calibration of the display may be performed without user presence or assistance. Example displays disclosed herein perform a standalone calibration without requiring external sensors, devices or equipment (e.g., the drive source 120 of FIG. 1, external sensors (e.g., colorimeters, etc.). Further, to increase accuracy of the calibration measured values (e.g., look-up table data), example calibration system disclosed herein obtain a plurality of readings of a color setting and determine an average value of the readings for the measured color setting. The average value may increase output performance of the display by more accurately matching a color space output of the display with a color space encoded in an input data received by the display. Additionally, unlike some convention displays, example calibration systems disclosed herein generate new look-up tables when calibration is performed. In this manner, the look-up tables include the calibrated measurement values which more closely match the performance characteristics of the display.

At least some of the aforementioned examples include at least one feature and/or benefit including, but not limited to, the following:

In some examples, a display includes a sensor to measure a plurality of readings for color settings of a color pattern presented by the display. In some such examples, a processor calculates average values corresponding to respective ones of the plurality of readings for the color settings. In some such examples, a calibration manager generates calibrated measurement values based on the average values, the calibrated measurement values to enable determination of color space information for the display.

In some examples, a carrier supports the sensor. In some such examples, the carrier is attached to the display.

In some examples, the carrier is pivotally attached to a housing of the display, the carrier to rotate relative to the housing between a first position and a second position.

In some examples, the carrier is positioned within the housing when the carrier is in a non-calibration position and the carrier to project from the housing when the carrier is in a calibration position.

In some examples, a drive system is to rotate the carrier between the first position and the second position, the drive system including a motor operatively coupled to the carrier via a gear transmission.

In some examples, the motor is positioned in the housing of the display.

In some examples, the gear transmission includes a worm gear driven by an output shaft of the motor and a spur gear coupled to a proximal end of the carrier.

In some examples, at least one of the color settings includes a tristimulus value of at least one of white, black, red, green, blue, cyan, yellow, or magenta.

In some examples, the plurality of readings includes at least five readings for each color setting.

In some examples, a method for calibrating a display includes presenting a plurality of color settings in a viewing area of the display adjacent a calibration sensor. In some such examples, the method includes measuring a plurality of readings for corresponding ones of the color settings. In some such examples, the method includes calculating a respective average value of corresponding ones of the readings for corresponding ones of the measured color settings. In some such examples, the method includes generating calibrated measurement values based on the average values. In some such examples, the method includes adjusting color space information of the display based on the calibrated measurement values.

In some examples, the method includes moving a sensor from a first position to a second position, the sensor being positioned inside a housing of the display in the first position, and the sensor to at least partially protrude from the housing of the display when the sensor is in the second position.

In some such examples, the method includes automatically calibrating the display without involvement from of a user.

In some examples, a tangible computer-readable medium comprises instructions that, when executed, cause a machine to at least: present a plurality of color settings in a viewing area of a display adjacent a sensor; measure a plurality of readings for corresponding ones of the color settings; calculate a respective average value of corresponding ones of the readings for corresponding ones of the measured color settings; generate calibrated measurement values based on the average values; and adjust color space information of the display based on the calibrated measurement values.

In some examples, the instructions, when executed, cause the machine to move the sensor from a first position to a second position, the sensor being positioned inside a housing of the display in the first position, and the sensor to at least partially protrude from the housing when the sensor is in the second position In some examples, the instructions, when executed, cause the machine to automatically calibrate the display without involvement from of a user.

As noted at the beginning of this Description, the examples shown in the figures and described above illustrate but do not limit the disclosure. Other forms, details, and examples may be made and implemented. Therefore, the foregoing description should not be construed to limit the scope of the disclosure, which is defined in the following claims.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A display comprising:
a first sensor to measure first readings for color settings of
   a color pattern presented by the display, the first sensor to measure the first readings at a first location on the display during a calibration cycle;

a first carrier pivotally attached to a housing of the display, the first carrier to rotate relative to the housing between a first position and a second position, the first carrier structured to move the first sensor between a first non-calibration position and a plurality of first calibration positions, the first calibration positions defined along a first arcuate path of the first carrier between the first position and the second position, at least a first one of the first calibration positions corresponding to the first location on the display;

a first drive system to rotate the first carrier between the first position and the second position, the first drive system including:
 a first motor having a first output shaft;
 a first worm gear directly driven by the first output shaft of the first motor; and
 a first spur gear coupled to a proximal end of the first carrier and enmeshed with the first worm gear;

a second sensor to measure second readings for color settings of the color pattern presented by the display, the second sensor to measure the second readings at a second location on the display during the calibration cycle, the first location being different than the second location;

a second carrier pivotally attached to a housing of the display, the second carrier to rotate relative to the housing between a third position and a fourth position, the second carrier structured to move the second sensor between a second non-calibration position and a plurality of second calibration positions, the second calibration positions defined along a second arcuate path of the second carrier defined between the third position and the fourth position, at least one of the second calibration positions corresponding to the second location on the display;

a second drive system to rotate the second carrier between the third position and the fourth position, the second drive system including:
 a second motor having a second output shaft;
 a second worm gear directly driven by the second output shaft of the second motor; and
 a second spur gear coupled to a proximal end of the second carrier and enmeshed with the first worm gear;

a processor to calculate average values corresponding to respective ones of the first readings for the color settings and respective ones of the plurality of second readings for the color settings; and a calibration manager to generate calibrated measurement values based on the average values, the calibrated measurement values to enable determination of color space information for the display.

2. The display of claim 1, wherein the first carrier is positioned within a cavity formed in the housing when the first sensor is in the first non-calibration position and the first carrier is to project from the housing when the first sensor is in the first calibration positions.

3. The display of claim 1, wherein the first motor and the second motor are positioned in the housing of the display.

4. The display of claim 1, wherein at least one of the color settings includes a tristimulus value of at least one of white, black, red, green, blue, cyan, yellow, or magenta.

5. The display of claim 1, wherein the first sensor and the second sensor move synchronously.

6. The display of claim 1, wherein the first sensor moves independently from the second sensor.

7. The display of claim 1, wherein the first sensor is positioned within the housing and hidden from view by a bezel of the display when the first carrier is in the first position and the second sensor is positioned within the housing and hidden from view by the bezel when second carrier is in the third position.

8. The display of claim 1, wherein the first sensor is a tristimulus colorimeter that measures a plurality of spectral energy readings along a visible spectrum by using filtered photodetectors.

9. The display of claim 1, wherein the first carrier includes a third calibration sensor, the first calibration sensor is positioned adjacent a distal end of the first carrier and the third calibration sensor is positioned adjacent the first calibration sensor.

10. The display of claim 1, wherein a longitudinal axis of the first output shaft is parallel relative to an upper frame of the display and a rotational axis of the first spur gear is oriented substantially perpendicular relative to the longitudinal axis of the first output shaft.

11. The display of claim 1, wherein the first calibration sensor is positioned in an opening formed in a front surface of the first carrier and offset or recessed relative to the front surface to restrict stray ambient light in an environment from reaching the first calibration sensor during a calibration operation.

12. The display of claim 1, further including a shield positioned along at least a portion of the first carrier adjacent the first calibration sensor to shield the calibration sensor from stray ambient light.

13. The display of claim 1, wherein the patterns generated include images or patterns presented on a viewing area of the display to enable the first and second calibration sensors to measure tristimulus values for primary colors and tristimulus values for greyscales.

14. A method for calibrating a display, the method comprising:
 presenting a plurality of color settings in a viewing area of the display;
 rotating a first carrier relative to the display via a first drive system between a first position and a second position to move a first calibration sensor carried by the first carrier between a first non-calibration position and one of a plurality of first calibration positions defined along a first path of the first carrier between the first position and the second position, the first drive system including a first motor operatively coupled to the first carrier via a first gear transmission, the first gear transmission including a first worm gear and a first spur gear, the first worm gear carried and driven by a first output shaft of the first motor, the first spur gear coupled to a proximal end of the first carrier and enmeshed with the first worm gear;
 locating the first calibration sensor at a first location of the display during a calibration process, the first location corresponding to one of the first calibration positions;
 measuring, via the first calibration sensor, a plurality of first readings for the color settings at the first location;
 rotating a second carrier relative to the display via a second drive system between a third position and a fourth position to move a second calibration sensor carried by the second carrier between a second non-calibration position and one of a plurality of second calibration positions defined along a second path of the second carrier between the third position and the fourth position, the second drive system including a second motor operatively coupled to the second carrier via a second gear transmission, the second gear transmission including a second worm gear and a second spur gear, the second worm gear carried by a second output shaft of the second motor, the second spur gear coupled to a proximal end of the second carrier and enmeshed with the second worm gear;

locating the second calibration sensor at a second location of the display during the calibration process, the second location corresponding to one of the second calibration positions, the first location is different than the second location;

measuring, via the second calibration sensor, a plurality of second readings for the color settings at the second location;

calculating a respective average value of the first readings and the second readings for the measured color settings; and generating calibrated measurement values based on the average values.

15. The method of claim 14, further including moving the first carrier and the first calibration sensor inside a first portion of a housing of the display when the first calibration sensor is in the first non-calibration position, and causing the first carrier and the first calibration sensor to at least partially protrude from the housing of the display when the first calibration sensor is in one of the first calibration positions.

16. The method of claim 14, further including automatically calibrating the display without involvement from of a user.

17. A tangible computer-readable medium comprising instructions that, when executed, cause a machine to at least:
present a plurality of color settings in a viewing area of a display;
command a first drive system to rotate a first carrier relative to the display between a first position and a second position to move a first calibration sensor carried by the first carrier between a first non-calibration position and one of a plurality of first calibration positions defined along a first path of the first carrier between the first position and the second position the first drive system including a first motor operatively coupled to the first carrier via a first gear transmission, the first gear transmission including a first worm gear and a first spur gear, the first worm gear carried and driven by a first output shaft of the first motor, the first spur gear coupled to a proximal end of the first carrier and enmeshed with the first worm gear;
locate the first calibration sensor at a first location of the display during a calibration process, the first location corresponding to one of the first calibration positions;
command a second drive system to rotate a second carrier relative to the display between a third position and a fourth position to move a second calibration sensor carried by the second carrier between a second non-calibration position and one of a plurality of second calibration positions defined along a second path of the second carrier between the third position and the fourth position, the second drive system including a second motor operatively coupled to the second carrier via a second gear transmission, the second gear transmission including a second worm gear and a second spur gear, the second worm gear carried and driven by a second output shaft of the second motor, the second spur gear coupled to a proximal end of the second carrier and enmeshed with the second worm gear;
locate the second calibration sensor at a second location of the display during the calibration process, the second location corresponding to one of the second calibration positions;
present a plurality of color settings in the first viewing area of the display adjacent the first calibration sensor and the second calibration sensor;
measure a plurality of first readings and second readings for corresponding ones of the color settings;
calculate a respective average value of corresponding ones of the measured color settings;
generate calibrated measurement values based on the average values; and
adjust color space information of the display based on the calibrated measurement values.

18. The computer-readable medium as defined in claim 17, wherein the instructions, when executed, cause the machine to automatically calibrate the display without involvement from of a user.

* * * * *